(12) United States Patent
Akiyama

(10) Patent No.: US 7,245,436 B2
(45) Date of Patent: Jul. 17, 2007

(54) ILLUMINATION DEVICE AND PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/329,132

(22) Filed: Jan. 11, 2006

(65) Prior Publication Data

US 2006/0176564 A1   Aug. 10, 2006

(30) Foreign Application Priority Data

Feb. 9, 2005   (JP) .............................. 2005-032765
Oct. 20, 2005  (JP) .............................. 2005-305306

(51) Int. Cl.
    *G02B 27/10*   (2006.01)

(52) U.S. Cl. ..................................... 359/619; 359/621
(58) Field of Classification Search ............... 359/621
    See application file for complete search history.

(56) References Cited

U.S. PATENT DOCUMENTS

| 2002/0008910 A1* | 1/2002 | Akiyama et al. ........... 359/499 |
| 2002/0039157 A1* | 4/2002 | Nakanishi et al. ............ 349/95 |
| 2005/0174773 A1* | 8/2005 | Fujisawa et al. ............ 362/261 |

FOREIGN PATENT DOCUMENTS

JP   A-2002-023108   1/2002

* cited by examiner

*Primary Examiner*—Jordan Schwartz
*Assistant Examiner*—James C. Jones
(74) *Attorney, Agent, or Firm*—Oliff & Berridge, PLC

(57) ABSTRACT

An illumination device includes a light source, a first lens array having a plurality of first small lenses, a second lens array having a plurality of second small lenses corresponding to the plurality of first small lenses, and a superimposing lens. The plurality of first small lenses is made eccentric in a certain direction while the plurality of second small lenses is made eccentric in one of the certain direction and a direction orthogonal to the certain direction. The first and second lens arrays are integrally formed into one light-transmissive member.

20 Claims, 12 Drawing Sheets

ILLUMINATION DEVICE AND PROJECTOR

BACKGROUND

The present invention can relate to an illumination device and projector.

There is illustrated, in FIGS. 9A and 9B, a projector 1000a and an illumination device 100a in a related art. FIG. 9A shows an optical system of the projector 1000a in the related art while FIG. 9B shows an essential part of the illumination device 100a used on the projector 1000a in the related art. In FIG. 10, there is illustrated a shadow being displayed on the projector 1000a in the related art.

The projector 1000a in the related art has, as shown in FIG. 9A, an illumination device 100a, a color-separating light-guiding system 200 that separates the illuminating light flux of from the illumination device 100a into three colors of light, e.g. red, green and blue, and guides those to an illumination area, three liquid-crystal devices 400R, 400G, 400B that modulate the illuminating light fluxes of from the color-separating light-guiding system 200, a cross-dichroic prism 500 that combines together the colors of light modulated by the three liquid-crystal devices 400R, 400G, 400B, and a projection system 600 that projects the illuminating light flux combined together by the cross-dichroic prism 500 onto a projection plane of a screen SCR (see FIG. 10) or the like.

The illumination device 100a has a light source 110a that emits a nearly-collimated illuminating light flux toward the illumination area, a first lens array 130a having a plurality of first small lenses for splitting the illuminating light flux of from the light source 110a into a plurality of partial light fluxes, a second lens array 140a having a plurality of second small lenses corresponding to the plurality of first small lenses of the first lens array 130a, a polarization conversion element 150a that converts the partial light fluxes exiting the plurality of second small lenses of the second lens array 140a into linearly polarized light, and a superimposing lens 160a that superimposes the partial light fluxes of from the polarization conversion element 150a onto the illumination area. The light source 110a has an arc tube 112, not shown, and a parabolic reflector 114a that reflects the light of from the arc tube 112 toward the illumination area. The illumination device 100a thus structured is set up such that the first small lenses of the first lens array 130a have a contour similar to the shape of the illumination area. The images by the first small lenses of the first lens array 130a, are superimposed together onto the illumination area by the second lens array 140a and superimposing lens 160a. Namely, the first small lenses of the first lens array 130a and the illumination area are in a conjugational relationship.

In the projector 1000a in the related art, the first small lenses of the first lens array 130a are made eccentric as shown in FIG. 9B so that the illuminating light fluxes from the first lens array 130a can be incident only upon an effective incident area 153a of the polarization conversion element 150a (i.e. incident upon a polarization separation layer 152a instead of upon the reflective layer 154a), thus improving the light utilization efficiency for the projector (see JP-A-2002-23108, for example).

In the projector 1000a of the related art, however, steps S (see FIG. 9B) exists between the first small lenses made eccentric for the first lens array 130a. Because of the conjugation relationship between the first small lenses and the illumination area, a shadow or irregular reflection due to the steps S has conspicuous effects upon the illumination area. Meanwhile, there is often a case that sag of the edge surface (curved surfaces formed in the corner of a lens peripheral edge instead of being formed at a regular angle) occur during fabrication of a first lens array 130a because of the presence of steps S, thus darkening the illumination area at its peripheral region. As a result, there encounters a setback that a shadow occurs in a peripheral region of display area, as shown in FIG. 10.

For this reason, there is a proposal of another illumination device 100b (not shown) free of steps in the first lens array (see JP-A-2002-23108, for example). FIG. 11 shows an essential part of the illumination device 100b. This illumination device 100b has no steps in the first lens array 130b as shown in FIG. 11, thus suppressing against the problem that a shadow occurs in an outer peripheral region of display area.

However, for the projector, there is a demanded to improve light utilization efficiency and reduce cost furthermore.

SUMMARY

Therefore, an advantage of some aspects of the invention can be to provide an illumination device capable of improving light utilization efficiency and reduce cost for the projector, and to provide a projector provided with such an illumination device.

An exemplary illumination device according to an aspect of the invention can comprise: a light source that emits an illuminating light flux toward an illumination area; a first lens array having a plurality of first small lenses to split an illuminating light flux emitted from the light source into a plurality of partial light fluxes; a second lens array having a plurality of second small lenses corresponding to the plurality of first small lenses of the first lens array; and a superimposing lens that superimposes together partial light fluxes exiting the plurality of second small lenses of the second lens array onto the illumination area. The plurality of first small lenses is made eccentric in a certain direction, and the plurality of second small lenses is made eccentric in one of the certain direction and a direction orthogonal to the certain direction. Further, the first and second lens arrays being integrally formed into one light-transmissive member.

With this structure, by integrally forming the first and second lens arrays into one light-transmissive member, it is possible to eliminate the two interfaces of between air and the optical member (first-lens-array light exit surface and second-lens-array light incident surface), thus reducing unwanted reflections and improving the light utilization efficiency. Meanwhile, further cost reduction is possible because the optical components can be reduced in the number (from two (first and second lens arrays) to one (light-transmissive member)).

The light-transmissive member can suitably use quartz glass, hard glass, crystallized glass, sapphire, crystal or plastic, for example, as a material.

The first lens array can have a thickness adjusted at the first small lenses in a manner reducing steps in boundaries between the first small lenses while the second lens array has a thickness adjusted at the second small lenses in a manner reducing steps in boundaries between the second small lenses.

Where integrally forming first and second lens array into a light-transmissive member, the thickness increases as compared to that of the usual lens or the like. When forming a light-transmissive member integrally formed with the first and second lens arrays by pressing, mold release becomes difficult in case there are great steps in the boundaries between the first small lenses of the first lens array and in the boundaries between the second small lenses of the second lens array. This results in a problem that sag of the edge surface and breaks often occur, thus making it impossible to fabricate a lens array having a desired form as a first and second lens arrays.

Contrary to this, with the above structure, the first lens array has a thickness adjusted at the first small lenses in a manner reducing steps in boundaries between the first small lenses while the second lens array has a thickness adjusted at the second small lenses in a manner reducing steps in boundaries between the second small lenses. This eliminates the problem of the impossibility to fabricate a lens array having a desired form as a first and second lens array.

In the meanwhile, where there is no eccentricity in the plurality of first small lenses and in the plurality of second small lenses, it is naturally easy to reduce the steps in the entire surface of the first and second lens arrays. However, where the plurality of first small lenses and the plurality of second small lenses are both made eccentric vertically and laterally, it is not easy to reduce the steps throughout the surface of the first and second lens arrays, thus making it not easy to fabricate a lens array having a desired form as a first and second lens array.

Contrary to this, with the above structure, both the plurality of first small lenses and the plurality of second small lenses are made eccentric only in any one of vertical and lateral directions. This makes it possible to reduce the steps throughout the surface of the first and second lens arrays and hence to fabricate a lens array having a desired form as a first and second lens array.

Incidentally, in the description, "small lens thickness" means the maximum distance between the light incident and exit surfaces of the small lens.

The exemplary illumination device according to an aspect of the invention can further comprise a polarization conversion element provided between the second lens array and the superimposing lens and that converts incident light into one kind of linearly polarized light and exits. The polarization conversion element has an effective incident area. Further, at least part of the first small lenses and at least part of the second small lenses are made eccentric in a manner allowing the partial light flux to be incident upon the effective incident area of the polarization conversion element.

With this structure, the illumination device is suitable for a projector having an electro-optical modulator of a type to modulate polarization light, e.g. a liquid-crystal device.

The light source can be to emit a substantially collimated illuminating light flux toward the illumination area, the plurality of first small lenses and the plurality of second small lenses being the same in eccentricity direction.

For an illumination device having a polarization conversion element, there is a need to cause images by the first-small lenses to be incident only upon an effective incident area of the polarization conversion element in order not to decrease light utilization efficiency. For this reason, it is important to favorably separate the images by the first-small lenses in a certain direction of the first lens array, for example, in a lateral direction, as compared to the case with an illumination device not having a polarization conversion element.

With the foregoing structure, in the case the plurality of first small lenses is made eccentric in a certain direction (e.g. laterally) of the first lens array, the partial light fluxes from the first lens array are of light traveling outward toward the second lens array on the plane parallel with eccentricity direction of the first lens array and with the axis of illumination light.

As a result, the images by the first-small lenses can be favorably separated along the eccentricity direction of the first lens array (e.g. laterally) to minimize the lowering of light utilization efficiency when the illumination device has a polarization conversion element.

With the above structure, the partial light fluxes from the first lens array are of light traveling outward on the plane parallel with the eccentricity direction (e.g. laterally) of the first lens array and with the axis of illumination light. However, because the second lens array is required to change it into light parallel with the axis of illumination light, the second lens array has a plurality of second small lenses made eccentric in a direction parallel with but opposite to (e.g. laterally of) the eccentricity direction of the first lens array.

With the above structure, the plurality of first small lenses is not made eccentric in a direction (e.g. vertically) other than the certain direction of the first lens array, in order to reduce the steps in the boundaries between the first small lenses. Meanwhile, the plurality of second small lenses is not made eccentric in a direction (e.g. vertically) other than the certain direction of the second lens array, in order to reduce the steps in the boundaries between the second small lenses.

As a result, in the case that the plurality of first small lenses and the plurality of second small lenses are the same in eccentricity direction, the second lens array has a size in the eccentricity direction (e.g. lateral size) greater than a size of the first lens array in the eccentricity direction (e.g. lateral size), and a size in a direction orthogonal to the eccentricity direction (e.g. vertical size) nearly equal to a size of the first lens array in a direction orthogonal to the eccentricity direction (e.g. vertical size).

In the exemplary illumination device according to an aspect of the invention, each of the plurality of first small lenses can be substantially rectangular in outer shape having longer and shorter sides, the plurality of first small lenses and the plurality of second small lenses being made eccentric in respective directions orthogonal to the longer side of the first small lens.

For example, where the illumination area has a shape laterally long, the first small lens also has an outer shape laterally long. Consequently, it is important, in the illumination device, to favorably separate the images by the first-small lenses vertically of the first lens array.

For this reason, the plurality of first small lenses is made eccentric in a direction orthogonal to the direction of the longer side of the first small lens of the first lens array (e.g. vertically in case the first small lens is laterally long in its outer shape). Consequently, the partial light fluxes of from the first lens array turn into light traveling outward toward the second lens array on the plane parallel with the direction orthogonal to the longer side of the first lens array (e.g. vertically in case the first small lens is laterally long in its outer shape) and with the axis of illumination light.

As a result, the images by the first-small lenses can be favorably separated vertically to the longer side of the first-small lens of the first lens array (e.g. vertically in case the first small lens is laterally long in its outer shape), to allow the partial light fluxes to favorably enter the second small lenses of the second lens array. This is suited for the shape of the illumination area (e.g. illumination area of an electro-optical modulator).

In the exemplary illumination device according to an aspect of the invention, the light source can be to emit a diverging illuminating light flux toward the illumination area, the plurality of first small lenses and the plurality of second small lenses is made eccentric in respective directions orthogonal to each other.

With this structure, the light source is to emit a diverging illuminating light flux toward the illumination area wherein the first lens array is made eccentric only in a certain direction (e.g. laterally). The partial light fluxes from the first lens array is of light parallel with the axis of illumination light on the plane parallel with the eccentricity direction of the first lens array (e.g. laterally) and with the axis of illumination light, and of light traveling outward toward the second lens array on the plane parallel with the direction orthogonal to the eccentricity direction of the first lens array (e.g. vertically) and with the axis of illumination light.

The partial light fluxes from the first lens array are of light traveling outward on the plane parallel with the direction orthogonal to the eccentric direction of the first lens array (e.g. vertically) and with the axis of illumination light. The second lens array is required to change it into light parallel with the axis of illumination light. Thus, as for the eccentricity direction of the second lens array, the plurality of second small lenses is made eccentric in a direction orthogonal to the eccentricity direction of the first lens array (e.g. vertically).

This makes it possible to favorably separate the images by the first-small lenses in two directions orthogonal to each other of the illumination device, and hence to minimize the light utilization efficiency for the illumination device having a polarization conversion element.

Meanwhile, in order to reduce the steps in the boundaries between the small lenses, the first small lenses of the first lens array are made eccentric only in a certain direction while the second small lenses of the second lens array are made eccentric only in a certain direction. However, because the light source is to emit a diverging illuminating light flux toward the illumination area wherein the first and second small lenses have their eccentricity directions orthogonal to each other, the images by the first-small lenses can be separated in two directions orthogonal to each other on the illumination device. Moreover, the light flux from the light-transmissive member can be of light parallel with the axis of illumination light.

As a result, provided that the plurality of first small lenses is made eccentric laterally of the light-transmissive member while the plurality of second small lenses is made eccentric vertically of the light-transmissive member, the second lens array has a size in its eccentricity direction (e.g. vertical size) greater than the size of first lens array in a direction orthogonal to its eccentricity direction (e.g. vertical size) while the second lens array has a size in a direction orthogonal to its eccentricity direction (e.g. lateral size) nearly equal to the size of first lens array in its eccentricity direction (e.g. lateral size). Meanwhile, provided that the plurality of first small lenses is made eccentric vertically of the light-transmissive member while the plurality of second small lenses is made eccentric laterally of the light-transmissive member, the second lens array has a size in its eccentricity direction (e.g. lateral size) greater than the size of first lens array in a direction orthogonal to its eccentricity direction (e.g. lateral size) while the second lens array has a size in a direction orthogonal to its eccentricity direction (e.g. vertical size) nearly equal to the size of first lens array in its eccentricity direction (e.g. vertical size).

In the exemplary illumination device according to an aspect of the invention, the light source emitting a substantially parallel illuminating light flux toward the illumination area can have an arc tube, an ellipsoidal reflector that reflects light of from the arc tube, and a concave lens that converts the light reflected by the ellipsoidal reflector into substantially collimated light.

Meanwhile, in the exemplary illumination device according to an aspect of the invention, the light source emitting an illuminating light flux to be diverged toward the illumination area can have an arc tube, an ellipsoidal reflector that reflects light of from the arc tube, and a concave lens that converts the light reflected by the ellipsoidal reflector into diverging light about the axis of illumination light.

With this structure, a light source can be realized more compact as compared to the light source using a parabolic reflector.

In the exemplary illumination device according to an aspect of the invention, the arc tube can be provided with an auxiliary mirror that reflects light, emitted from the arc tube toward the illumination area, toward the arc tube.

With this structure, the light, once radiated from the arc tube toward the illumination area, can be reflected toward the arc tube. Thus, there is no need to set up the ellipsoidal reflector in a size covering an end of arc tube closer to the illumination area, thus achieving to reduce the size of the ellipsoidal reflector and hence the size of the projector. Meanwhile, this means the capability to further reduce the size of the first lens array, the second lens array, the polarization conversion element, the superimposing lens and the like. Thus, the projector can be made further smaller in size.

A exemplary projector according to an aspect of the invention can comprise: an illumination device; an electro-optical modulator that modulates an illuminating light flux of from the illumination device, according to image information; and a projection system that projects an illuminating light flux modulated by the electro-optical modulator; wherein the illumination device is an exemplary illumination device of the invention.

With this structure, the projector can be further improved in light utilization efficiency and further reduced in cost.

In the exemplary projector according to an aspect of the invention, the electro-optical modulator can be provided in plurality to modulate a plurality of colors of light according to image information, the projector can further comprise a color-separating light-guiding system that separates an illuminating light flux of from the illumination device into a plurality of colors of light and guides the same to the respective ones of the plurality of electro-optical modulators, and a cross-dichroic prism that combines together the colors of light respectively modulated by the plurality of electro-optical modulators.

With this structure, the projector can be further improved in light utilization efficiency and further reduced in cost, which projector can be made as a full-color projector excellent in image quality (e.g. three-panel type).

BRIEF DESCRIPTION OF THE DRAWINGS

The exemplary embodiments will be described with reference to the accompanying drawings, wherein like numbers reference like elements, and wherein.

DESCRIPTION OF EXEMPLARY EMBODIMENTS

The illumination device and projector in association with the exemplary embodiments according to the present invention will now be described below refer to the drawings.

First Exemplary Embodiment

Figure 1A:
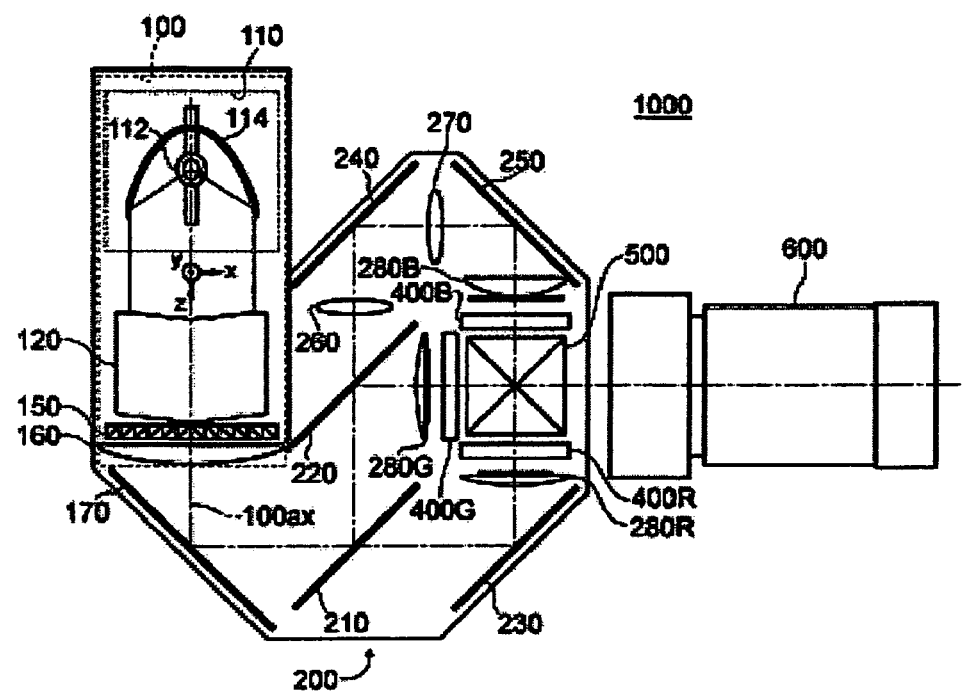
FIGS. 1A to 1C are views illustrating an illumination device and projector according to a first exemplary embodiment.
Figure 1B:
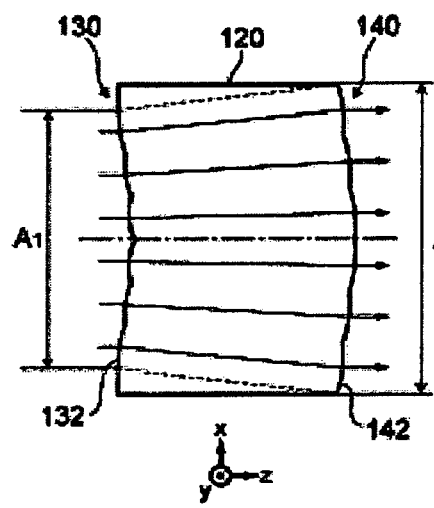
Figure 1C:
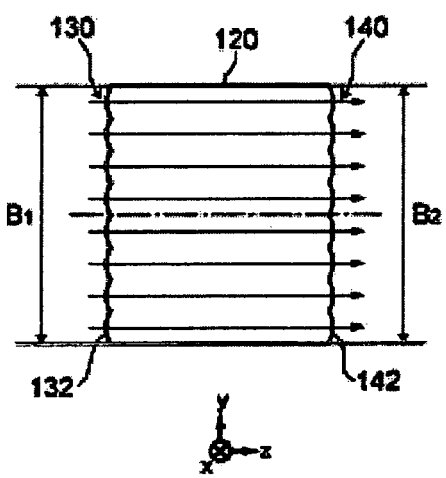

There is illustrated, in FIGS. 1A to 1C, an illumination device 100 and projector 1000 according to a first exemplary embodiment of the invention. FIG. 1A is a view showing an optical system of the projector 1000, FIG. 1B a top view of a light-transmissive member 120 used on the projector 1000, and FIG. 1C a side view of the light-transmissive member 120 used on the projector 1000.

Figure 2A:
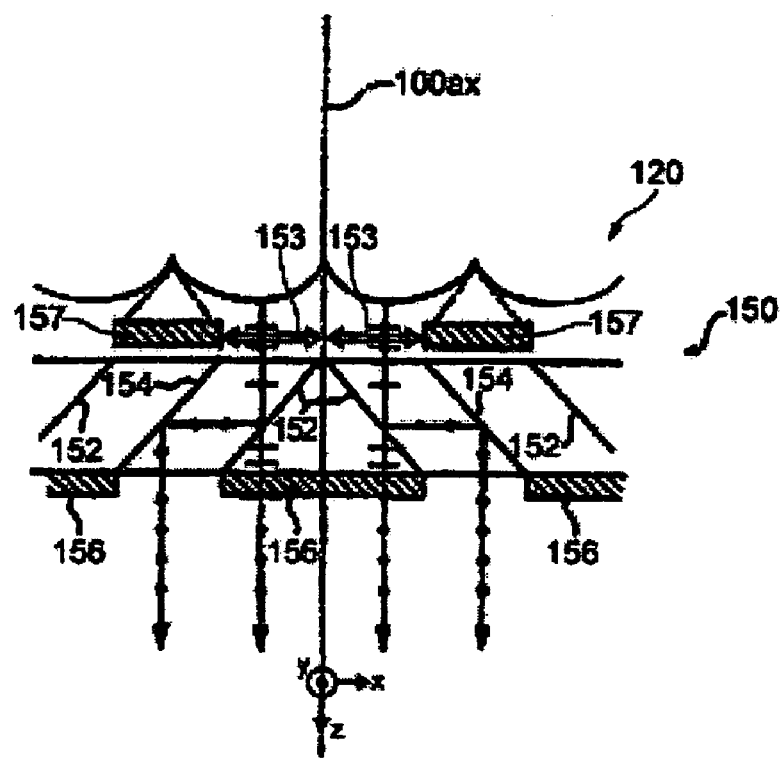
FIGS. 2A and 2B are views illustrating a polarization conversion element.
Figure 2B:
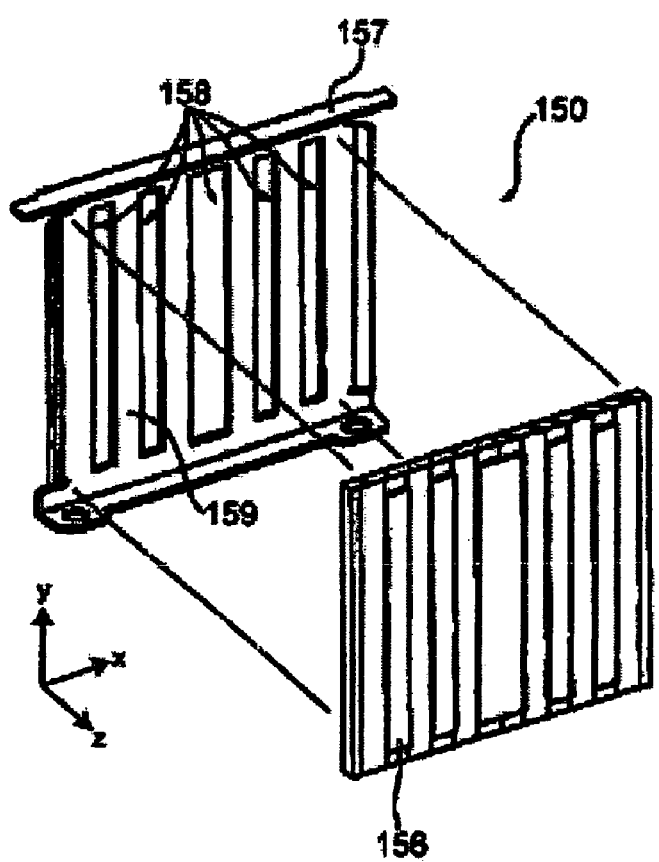

There is illustrated, in FIGS. 2A and 2B, a polarization conversion element wherein FIG. 2A is a top view of the polarization conversion element 150 in a part thereof while FIG. 2B is a perspective view of the polarization conversion element 150.

Figure 3A:
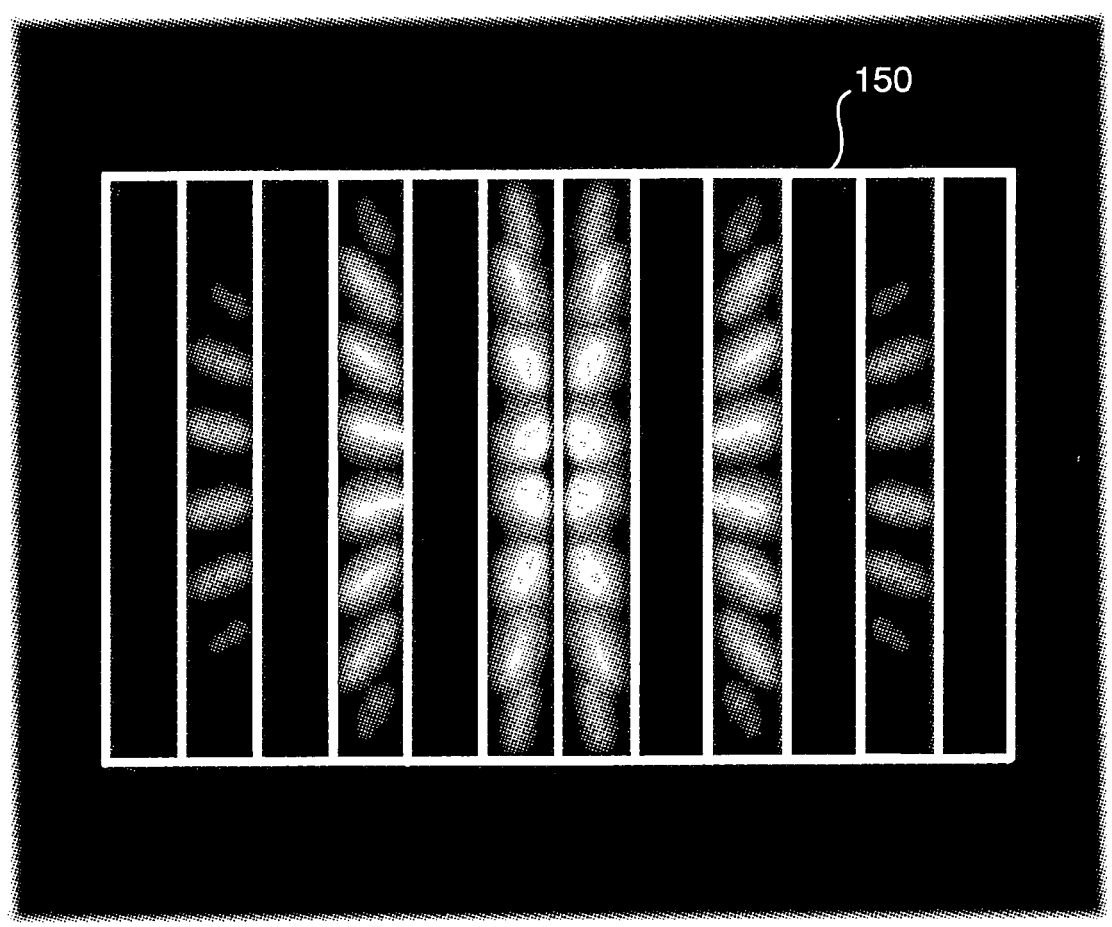
FIGS. 3A and 3B are figures illustrating the effect of the illumination device according to the first exemplary embodiment.
Figure 3B:
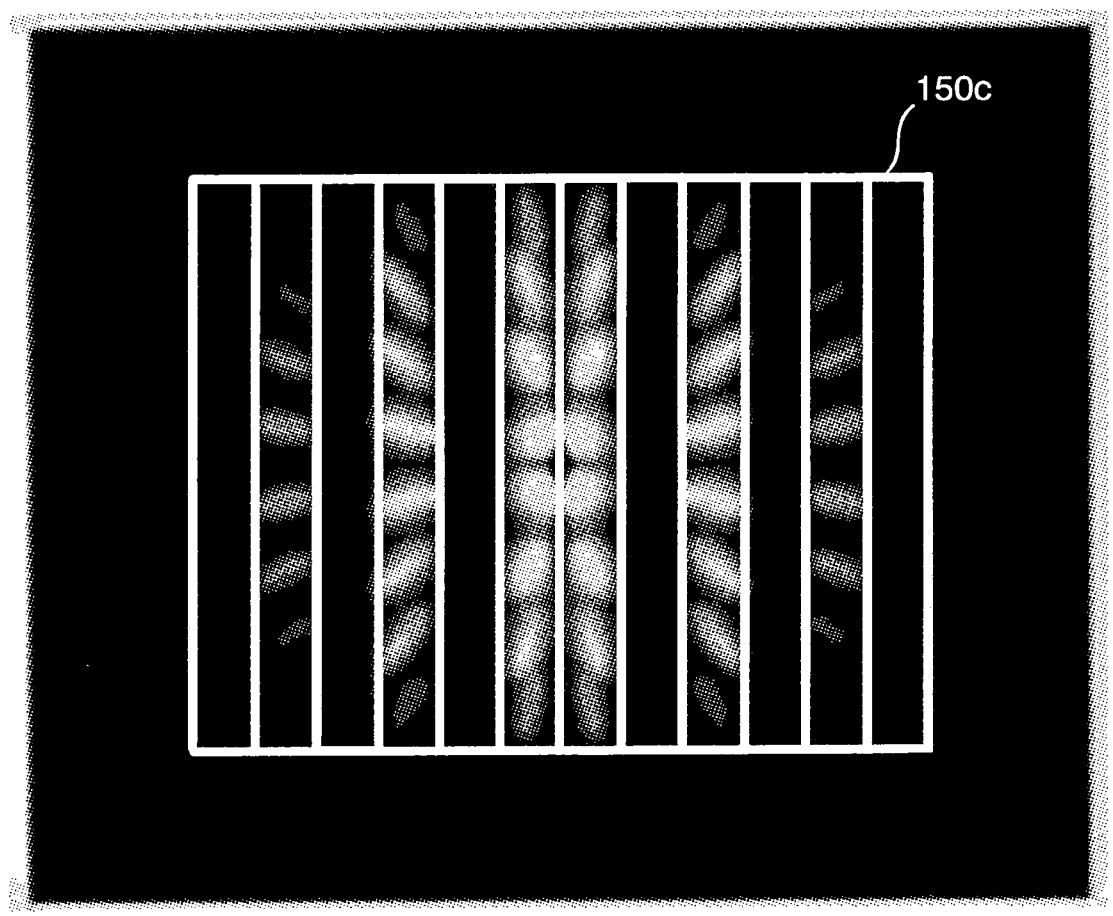

FIGS. 3A and 3B illustrate an effect of the illumination device 100 in the first exemplary embodiment. FIG. 3A shows images by the first small lenses 132 on a light-incident surface of the polarization conversion element 150 in the first exemplary embodiment. FIG. 3B shows images by the first small lenses on a light-incident surface of the polarization conversion element 150c in a comparative example. The illumination device 100c (not shown) in the comparative example has the small lenses that first and second lens arrays are both not made eccentric.

Note that, the ensuing description is assumed on that three directions mutually orthogonal are taken as z-direction (direction of an axis 100ax of illumination light in FIG. 1A), x-direction (direction parallel with the page and orthogonal to the z-axis in FIG. 1A), and y-direction (direction parallel with the page and orthogonal to the z-axis in FIG. 1A).

The projector 1000 in the first exemplary embodiment includes, as shown in FIG. 1A, an illumination device 100, a color-separation light-guiding system 200 that separates the illuminating light flux of from the illumination device 100 into red, green and blue, or three colors of light, and guiding them to an illumination area, three liquid-crystal devices 400R, 400G, 400B as electro-optic modulators that modulates the three colors of light separated by the color-separation light-guiding system 200 according to image information, a cross-dichroic prism 500 that combines together the colors of light modulated by the three liquid-crystal devices 400R, 400G, 400B, and a projection system 600 that projects the light combined by the cross-dichroic prism 500 onto a projection surface of a screen SCR (not shown).

The illumination device 100 in the first exemplary embodiment has, as shown in FIGS. 1A to 1C, a light source 110 that emits a nearly-collimated illuminating light flux toward the illumination area, a light-transmissive member 120 formed integrally with a first lens array 130 having a plurality of first small lenses 132 that separates the illuminating light flux emitted from the light source 110 into a plurality of partial light fluxes and a second lens array 140 having a plurality of second small lenses 142 corresponding to the plurality of first small lenses 132 of the first lens array 130, a polarization conversion element 150 that aligns the illuminating light fluxes having different polarizing direction emitted from the light source 110 into one kind of linearly polarized light, and a superimposing lens 160 that superimposes, onto the illumination area, the partial light fluxes exiting the polarization conversion element 150.

The light source 110 has a parabolic reflector 114 and an arc tube 112 having a light-emission center in the vicinity of a focal point of the parabolic reflector 114. The arc tube 112 has a tubular bulb and a pair of seals extending at the both sides of the tubular bulb. The parabolic reflector 114 is to reflect the light radiated from the emission center of the arc tube 112 and emit it as an illuminating light flux parallel with the axis 100ax of illumination light.

The illuminating light flux, emitted from the parabolic reflector 114, enters the light-transmissive member 120. The light-transmissive member 120 is structured such that the illuminating light flux, is allowed to enter the first lens array 130 at its first small lenses 132 and split into a plurality of partial light fluxes in accordance with the number of the first small lenses 132. The partial light fluxes, exiting the first lens array 130, transmit an interior of the light-transmissive member 120 and then exit at the second lens array 140 having the second small lenses 142 respectively corresponding to the first lenses 132. Incidentally, the light-transmissive member 120 will be detailed later.

The partial light fluxes, exiting the second lens array 140, are collected to a vicinity of polarization separation layers 152 of a polarization conversion element 150 that aligns the light, polarized in random directions, into one kind of linearly polarized light.

The polarization conversion element 150 has a structure alternately arranged with a polarization separation layer 152 and a reflection layer 154 with inclination relative to the axis 100ax of illumination light, as shown in FIG. 2A. The polarization separation layers 152 allow one of P and S polarized light fluxes contained in the partial light fluxes to pass but reflect the other thereof. The other polarized light fluxes, reflected by the polarization separation layers 152, are bent by the reflection layers 154 and then allowed to exit there in an exiting direction of one polarized light fluxes along the axis 100ax of illumination light. The polarization conversion element 150 has, on its light-exit surface, a phase plate 156 so that any of exiting polarized light fluxes is converted in polarization by the phase plate 156. Thus, nearly all part of the polarized light fluxes is aligned in polarization.

Meanwhile, the polarization conversion element 150, at its light-incident side, is arranged with a shade plate 157 having openings 158 and a light shades 159 in a rectangular plate in a manner allowing light to enter only at an effective incident areas 153 corresponding to the polarization separation layers 152, as shown in FIG. 2B.

By using the polarization conversion element 150 thus structured, the illuminating light flux emitted from the light source 110 can be aligned into nearly one direction of linearly polarized light. This accordingly serves to improve the efficiency of light utilization at the liquid-crystal device 400R, 400G, 400B.

The plurality of partial light fluxes, aligned in polarization by the polarization conversion element 150, enter the superimposing lens 160 where they are superimposed in a manner to be laid one over another on the respective illumination areas of the liquid-crystal devices 400R. 400G, 400B, referred later.

The light flux exiting the superimposing lens 160 is bent by the reflection mirror 170, to enter a color-separation light-guiding system 200. The color-separation light-guiding system 200 has dichroic mirrors 210, 220, reflection mirrors 230, 240, 250, an incident-side lens 260 and a relay lens 270.

The dichroic mirror 210, 220 are optical elements that on a base plate is formed a wavelength-selective film to reflect the light flux in a predetermined wavelength region but to pass the light flux in the other wavelength region. The dichroic mirror 210, arranged forward on the optical path, is a mirror to pass a red component of light but to reflect the other components of light. The dichroic mirror 220, arranged rear on the optical path, is a mirror to reflect a green component of light but to pass a blue component of light.

The red light component, passed the dichroic mirror 210, is bent by the reflection mirror 230 and caused to enter the red-light liquid-crystal device 400R through a collective lens 280R. Meanwhile, the green light component, of the green and blue light components reflected upon the dichroic mirror 210, is reflected by the dichroic mirror 220 and caused to enter the green-light liquid-crystal device 400G through a collective lens 280G. Meanwhile, the blue light component, passed the dichroic mirror 220, is collected and bent by an incident-side lens 260, relay lens 270 and reflection mirrors 240, 250, and then caused to enter the blue-light liquid-crystal device 400B through a collective lens 280B. The incident-side lens 260, the relay lens 270 and the reflection mirrors 240, 250 have a function to guide the blue light passed the dichroic mirror 220 up to the blue-light liquid-crystal device 400B. Incidentally, the collective lenses 280R, 280G, 280B, are provided forward on the optical paths of the respective colors of light to the liquid-crystal devices 400R, 400G, 400B, in order to convert the partial light flux exiting the second lens array 140 of the light-transmissive member 120 into nearly-collimated light relative to the principal ray of the partial light flux.

Incidentally, the reason of providing the incident-side lens 260, the relay lens 270 and the reflection mirrors 240, 250 on the blue-light optical path is in order to prevent against the lowering in light utilization efficiency due to scattering of light because the optical path of blue light is longer than the optical path of other color of light. Although the projector 1000 in the first exemplary embodiment is structured like this because the blue-light optical path is long, it is possible to contemplate a structure that the red-light optical path is made longer to use an incident-side lens 260, a relay lens 270 and reflection mirrors 240, 250 on the red-light optical path.

The liquid-crystal devices 400R, 400G, 400B are to form a color image by modulating the incident illuminating light flux according to image information, which are to be illuminated by the illumination device 100. Incidentally, although not shown, incident-side polarizers are respectively interposed between the collective lenses 280R, 280G, 280B and the liquid-crystal devices 400R, 400G, 400B while exit-side polarizers are respectively interposed between the liquid-crystal devices 400R, 400G, 400B and the cross-dichroic prism 500. By those incident-side polarizers, liquid-crystal devices 400R, 400G, 400B and exit-side polarizers, optical modulations are made for the respective colors of incident light.

The liquid-crystal device 400R, 400G, 400B has a pair of light-transmissive glass substrates between which is hermetically sealed a liquid crystal as an electro-optical substance. For example, by use of polysilicon TFTs as switching elements, modulation is made for the linearly polarized light in one kind exiting the incident-side polarizer according to an image signal supplied.

The liquid-crystal device 400R, 400G, 400B has its image forming region in a planar form of "a rectangular in a ratio of a vertical size along the y-axis and a lengthwise size along the x-axis=3:4."

The cross-dichroic prism 500 is an optical element that is to form a color image by combining together the optical images exiting the exit-side polarizers and modulated color-by-color. The cross-dichroic prism 500 is nearly square in plan, i.e. four rectangular prisms bonded together, to form dielectric multi-layer films along the interfaces nearly in an X-form defined between the rectangular prisms bonded together. The dielectric multi-layer film, formed on one of the interfaces nearly in the X-form, is to reflect red light while the dielectric multi-layer film, formed on the other interface, is to reflect blue light. By the dielectric multi-layer films, red and blue light is bent and aligned with a traveling direction of green light. Thus, the three colors of light are combined together.

The color image, exiting the cross-dichroic prism 500, is projected with magnification by a projection system 600 thus forming a large image on a screen.

The illumination device 100 in the first exemplary embodiment has the light-transmissive member 120 integrally formed by the first lens array 130 and the second lens array 140. Now, description is made in detail on the light-transmissive member 120 of the illumination device 100 in the first exemplary embodiment.

The light-transmissive member 120 is an optical element, as mentioned before, oppositely arranged with a first lens array 130 and a second lens array 140 that are integrally formed by pressing, for example. In the first lens array 130, the rectangular-contoured first small lenses 132 are arranged vertically (in the y-direction) and laterally (in the x-direction) in a matrix form. In the second lens array 140, the second small lenses 142, corresponding to the first small lenses 132, are arranged vertically (in the y-direction) and laterally (in the x-direction) in a matrix form. Note that, in the following exemplary embodiments, explanation is by taking a column vertically (in the y-direction) and a row laterally (in the x-direction).

The light-transmissive material 120 suitably uses, as a material, quartz glass, hard glass, crystallized glass, sapphire, crystal or plastic, for example.

The light-transmissive member 120 is structured to split the illuminating light flux from the light source 110 into a plurality of partial light fluxes and collect the partial light fluxes in vicinity of the polarization separation layers 152 (see FIG. 2A) of the polarizer conversion element 150. Consequently, focused images based on the partial light fluxes are to be formed in the vicinity of the polarization separation layers 152. Those focused images are the image of the light-emitting portion of the arc tube 112.

Here, provided that the light-emitting portion of the arc tube is an ideal spot light source and the illumination device is an ideal optical system free of design and assembly errors, the focused image formed nearby the polarization separation layers of the polarization conversion element is provided as a point. However, because the light-emitting portion of the arc tube 112 has a given size, the focused image formed nearby the polarization separation layers 152 also is in a given size. For this reason, in order to permit those focused images to be effectively incident upon the polarization separation layers 152, the polarization separation layer 152 is set with an effective incident area 153 in a size allowing light to be effectively incident upon the polarization separation layer 152. Namely, the partial light flux incident upon the effective incident area 153 turns into one kind of linearly polarized light and then exits the polarization conversion element 150.

In the light-transmissive member 120 of the illumination device 100 in the first exemplary embodiment, the plurality of first small lenses 132 of the first lens array 130 and the plurality of second small lenses 142 of the second lens array 140 are structured by such eccentric lenses as to allow the partial light flux to be incident upon the effective incident area 153 and form a focused image in the vicinity of the polarization separation layer 152 (eccentric lenses deviated between the lens optical axis and the lens geometric center).

In the illumination device 100 in the first exemplary embodiment, the plurality of first small lenses 132 is made eccentric laterally (x-direction) of among the vertical and lateral directions of the first lens array 130, as shown in FIGS. 1B and 1C. The plurality of second small lenses 142 is made eccentric laterally (x-direction) of among the vertical and lateral directions of the second lens array 140.

Incidentally, in the illumination device 100 in the first exemplary embodiment, the partial light flux from the first lens array 130 is of light traveling outward on the plane parallel with the lateral direction (x-direction) of the first lens array 130 and with the axis 100ax of illumination light (z-direction). The second lens array 140 is required to change it into light traveling parallel with the axis 100ax of illumination light. For this reason, the plurality of second small lenses 142 is made eccentric laterally (in the x-direction) of the second lens array 140.

Meanwhile, in the illumination device 100 in the first exemplary embodiment, the plurality of first small lenses 132 is not made eccentric vertically (in the y-direction) of the first lens array 130 in order to reduce the steps in the boundaries between the first small lenses 132. Meanwhile, the plurality of second small lenses 142 is not made eccentric vertically (in the y-direction) of the second lens array 140 in order to reduce the steps in the boundaries between the second small lenses 142. In this manner, the first small lens 132 and the second small lens 142 are made eccentric (deviated between the lens optical axis and the lens geometric center) oppositely in direction to each other along the axis in a certain direction.

As a result, in the illumination device 100 in the first exemplary embodiment, as shown in FIG. 1B and FIG. 1C, the second lens array 140 has a lateral size $A_2$ greater than the lateral size $A_1$ of the first lens array 130 while the second lens array 140 has a vertical size $B_2$ nearly equal to the vertical size $B_1$ of the first lens array 130.

The first small lenses 132 of the first lens array 130 are made eccentric, all together, in the same direction (in the x-direction) on a column-by-column basis. Namely, the first small lenses 132 constituting the same column have respective optical axes in the same position in the x-direction wherein the lens geometric centers thereof are also in the same position in the x-direction. Meanwhile, the first small lenses 132 are not made eccentric in the y-direction. In this manner, the first lens array 130 is made eccentric, all together, only on a column-by-column basis wherein the first small lenses are different in their surface forms on a column-by-column basis. Thus, the first small lenses 132 are adjusted in thickness on the column-by-column basis in a manner reducing the steps in the column boundaries.

The second small lenses 142 of the second lens array 140 are also made eccentric, all together, in the same direction (in the x-direction) on a column-by-column basis similarly to the first lens array 130. Accordingly, the second small lenses 142 are adjusted in thickness on the column-by-column basis in a manner reducing the steps in the column boundaries.

Incidentally, in the illumination device 100 of the first exemplary embodiment, the first small lenses 132 are set with an outer shape, as viewed along the axis 100ax of illumination light (in the z-direction), nearly similarity to the shape of the illumination area on the liquid-crystal display 400R, 400G, 400B. For example, because the image forming area of the liquid-crystal device 400R, 400G, 400B has an aspect ratio (ratio in vertical-to-horizontal dimensions) of 3:4, the first small lenses 132 are set with an aspect ratio of 3:4.

Accordingly, the illumination device 100 in the first exemplary embodiment makes it possible to reduce the steps throughout the surface of the first lens array 130 and second lens array 140. Naturally, those steps can be eliminated from the entire surface of the first lens array 130 and second lens array 140.

In the illumination device 100 of the first exemplary embodiment, the light source 110 is to emit an illuminating light flux, traveling nearly parallel with the axis 100ax of illumination light, toward the illumination area.

Therefore, according to the illumination device 100 of the first exemplary embodiment, the illuminating light fluxes, emitted parallel with the axis 100ax of illumination light from the light source 110, are turned by the first lens array 130 made eccentric only laterally (in the x-direction) on a column-by-column basis into partial light fluxes traveling outward toward the second lens array 140 on the plane parallel with the lateral direction of the first lens array 130 (in the x-direction) and with the axis 100ax of illumination light (in the z-direction), and into partial light fluxes traveling parallel with the axis 100ax of illumination light as they are and toward the second lens array 140 on the plane parallel with the vertical direction of the first lens array 130 (in the y-direction) and with the axis 100ax of illumination light (in the z-direction).

The partial light fluxes, transmitted the light-transmissive member 120 by entering at its first lens array 130, are allowed by the second lens array 140 made eccentric only laterally (in the x-direction) on a column-by-column basis to exit again as partial light fluxes parallel with the axis 100ax of illumination light on the plane (on the xz plane) parallel with the lateral direction of the first lens array 130 (in the x-direction) and with the axis 100ax of illumination light (in the z-direction) from the second lens array 140, and to exit as partial light fluxes parallel with the axis 100ax of illumination light as they are on the plane (on the yz plane) parallel with the vertical direction of the first lens array 130 (in the y-direction) and with the axis 100ax of illumination light (in the z-direction) from the second lens array 140.

As a result, according to the illumination device 100 in the first exemplary embodiment, the images by the first small lenses 132 of the first lens array 130 can be favorably separated laterally (in the x-direction) of the first lens array 130, as shown in FIG. 3A. Even in the case the focused image of partial light flux has a given size, the partial light flux is positively incident upon the effective incident areas 153 (see FIG. 2A) of the polarization conversion element 150. This forms focused images in a position close to the polarization separation layers 152, thus improving the light utilization efficiency on the illumination device 100.

As described above, the illumination device 100 in the first exemplary embodiment is integrally formed by the first lens array 130 and second lens array 140, as one light-transmissive member 120 as shown in FIGS. 1A to 1C.

According to the illumination device 100 of the first exemplary embodiment, by integrally forming first and second lens arrays 130, 140 into one light-transmissive member 120, it is possible to eliminate the two interfaces of between air and the optical member (first-lens-array light exit surface and second-lens-array light incident surface) where the first and second lens arrays are separately structured as in the related art. This can reduce the unwanted reflections and hence improve the efficiency of light utilization. Meanwhile, because the first and second lenses 130, 140 are formed integral, there is no need to adjust the relative position of the first and second lens arrays. In addition, positional deviation does not occur after assembling. This facilitates the alignment with other optical components of the illumination device 100. Furthermore, cost reduction can be further achieved because of the capability of reducing the number of optical components (from two (first and second lens arrays) to one (light-transmissive member)).

Meanwhile, in the illumination device 100 of the first exemplary embodiment, the first lens array 130 is adjusted in thickness at the first small lenses 132 in a manner reducing the steps in the boundaries between the first small lenses 132 while the second lens array 140 is adjusted in thickness at the second small lenses 142 in a manner reducing the steps in the boundaries between the second small lenses 142.

Where integrally forming first and second lens arrays into a light-transmissive member as in the illumination device of the first exemplary embodiment, the resulting thickness increases as compared to the usual lens or the like. In case the steps are big in the boundaries between the first small lenses of the first lens array and in the boundaries between the second small lenses of the second lens array, mold release becomes not easy to carry out. This often causes sag of the edge surface and breaks thus resulting in a problem of difficulty in fabricating a lens array having a desired form as a first and second lens arrays.

Contrary to this, according to the illumination device 100 of the first exemplary embodiment, the first lens array 130 is adjusted in thickness at the first small lenses 132 in a manner reducing the steps in the boundaries between the first small lenses 132 while the second lens array 140 is adjusted in thickness at the second small lenses 142 in a manner reducing the steps in the boundaries between the second small lenses 142. This can eliminate the problem of the impossibility to fabricate a lens array having a desired form for first and second lens arrays.

Furthermore, in the illumination device 100 of the first exemplary embodiment, the plurality of first small lenses 132 is made eccentric in the laterally direction (in the x-direction) while the plurality of second small lenses 142 is made eccentric in the lateral direction (the x-direction).

Where the plurality of first and second small lenses is made not eccentric, reducing the steps is naturally easy to perform throughout the surface of the first and second lens arrays. Instead, where to make a plurality of first and second small lenses eccentric both in vertical and lateral directions, it is not easy to reduce the steps over the entire surface of the first and second lens arrays, and hence not easy to fabricate a lens arrays having a desired form for first and second lens arrays.

Contrary to this, according to the illumination device 100 of the first exemplary embodiment, the first and second small lenses 132, 142, both in plurality, are both made eccentric only laterally (in the x-direction). This makes it possible to reduce the steps throughout the surface of the first and second lens arrays 130, 140, and hence to fabricate a lens array having a desired form for first and second lens arrays.

As described above, the projector 1000 in the first exemplary embodiment has the illumination device 100, the liquid-crystal devices 400R, 400G, 400B for modulating an illuminating light flux of from the illumination device 100 according to image information, and a projection system 600 for projecting the illumination light flux modulated by the liquid-crystal devices 400R, 400G, 400B. Accordingly, light utilization efficiency and cost reduction can be achieved furthermore for the projector.

Second Exemplary Embodiment

Figure 4A:
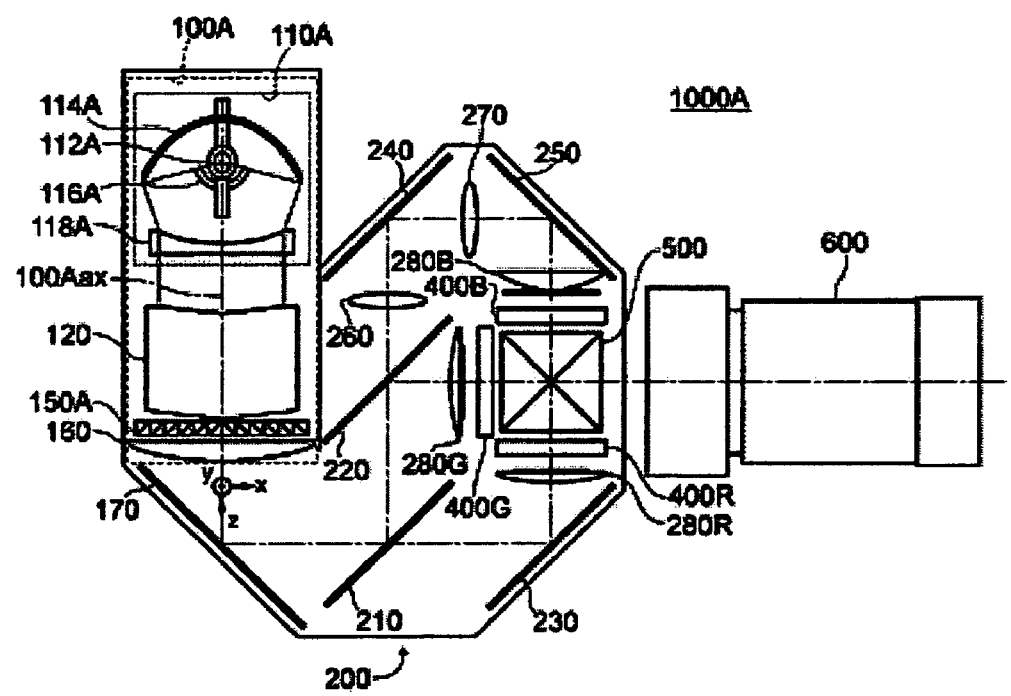
FIGS. 4A to 4C are views illustrating an illumination device and projector according to a second exemplary embodiment.
Figure 4B:
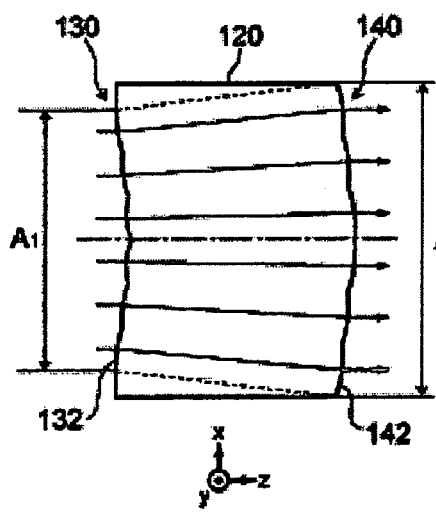
Figure 4C:
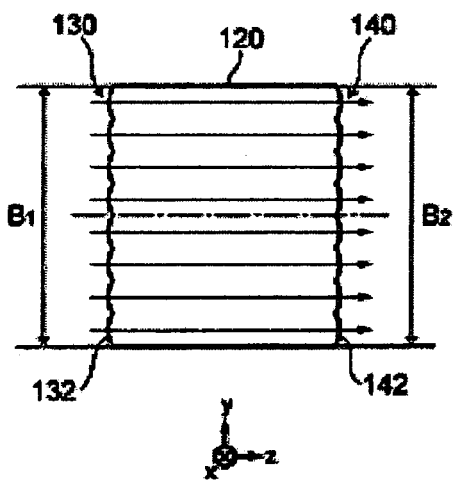

FIGS. 4A to 4C illustrate an illumination device 100A and projector 1000A according to a second exemplary embodiment. FIG. 4A is a view showing an optical system of the projector 1000A, FIG. 4B a top view of a light-transmissive member 120 used on the projector 1000A, and FIG. 4C a side view of the light-transmissive member 120 used on the projector 1000A.

The illumination device 100A in the second exemplary embodiment has a structure basically similar to the illumination device 100 of the first exemplary embodiment but is different in light-source structure from the illumination device 100 of the first exemplary embodiment, as shown in FIG. 4A.

Namely, the illumination device 100A in the second exemplary embodiment employs, as a light source, a light source 110A including an ellipsoidal reflector 114A, an arc tube 112A arranged close to a first focal point of the ellipsoidal reflector 114A, an auxiliary mirror 116A arranged on the arc tube 112A at a side closer to an illumination area and for reflecting, toward the ellipsoidal reflector 114A, the light radiated from the arc tube 112A to the illumination area, and a concave lens 118A that changes the converging light reflected by the ellipsoidal reflector 114A into collimated light traveling nearly parallel with the axis 100Aax of illumination light.

The arc tube 112A has a bulb portion and a pair of seal portions extending at the both sides of the bulb.

The ellipsoidal reflector 114A is to emit the light, radiated from an emission center of a light-emitting portion of the arc tube 112A arranged nearby the first focal point, as convergent light to be converged to a second focal point. The ellipsoidal reflector 114A is inserted and fixed to one of the seal portion of the arc tube 112A.

The auxiliary mirror 116A is a reflective member covering about a half of the bulb portion of the arc tube 112A and arranged opposite to a reflective concave surface of the ellipsoidal reflector 114A, as shown in FIG. 4A. The auxiliary mirror 116A is inserted and fixed to other of the seal portion of the arc tube 112A.

By using the auxiliary mirror thus structured, the light once radiated from the light-emitting portion of the arc tube 112A toward the opposite to the ellipsoidal reflector 114A (toward the illumination area) is reflected toward the light-emitting portion of the arc tube 112A by the auxiliary mirror 116A. The light, reflected by the auxiliary mirror 116A, is again radiated from the light-emitting portion of the arc tube 112A to the ellipsoidal reflector 114A and then reflected upon the reflective concave surface of the ellipsoidal reflector 114A, thus being converged to the second focal point. Accordingly, the use of the auxiliary mirror 116A makes it possible to converge, to the second focal point of the ellipsoidal reflector 114A, the light radiated oppositely to the ellipsoidal reflector (toward the illumination area) from the light-emitting portion of the arc tube 112A, similarly to the light radiated from the arc tube 112A directly toward the ellipsoidal reflector 114A.

The light from the ellipsoidal reflector 114A is converted by the concave lens 118A into light parallel with the axis 100Aax of illumination light, and allowed to exit to the first lens array 130 of the light-transmissive member 120.

In this manner, the illumination device 100A of the second exemplary embodiment is different in the structure of the light source from the illumination device 100 of the first exemplary embodiment. However, as shown in FIGS. 4A to 4C, because the first and second lens arrays 130, 140 are formed integral as one light-transmissive member 120, it is possible to eliminate two air-to-optical-member interfaces similarly to the illuminator device 100 in the first exemplary embodiment. This can reduce the unwanted reflections and hence improve the efficiency of light utilization. Meanwhile, cost reduction can be achieved because of the capability of reducing the number of optical components.

Meanwhile, according to the illumination device 100A of the second exemplary embodiment, the first lens array 130 is adjusted in thickness at the first small lenses 132 in a manner reducing the steps in the boundaries between the first small lenses 132 while the second lens array 140 is adjusted in thickness at the second small lenses 142 in a manner reducing the steps in the boundaries between the second small lenses 142. This can eliminate the problem of the impossibility to fabricate a lens array having a desired form for first and second lens arrays, similarly to the illumination device 100 in the first exemplary embodiment.

Furthermore, in the illumination device 100A of the second exemplary embodiment, the first and second small lenses 132, 142, both in plurality, are made eccentric only laterally (in the x-direction). This makes it possible to reduce the steps entire the surface of the first and second lens arrays 130, 140 similarly to the illumination device 100 in the first exemplary embodiment, and hence to fabricate a lens array having a desired form for first and second lens arrays.

Therefore, the illumination device 100A in the second exemplary embodiment can achieve to improve the light utilization efficiency and reduce the cost for the projector, similarly to the illumination device 100 in the first exemplary embodiment.

The projector 1000A in the second exemplary embodiment has the illumination device 100A, the liquid-crystal devices 400R, 400G, 400B for modulating the illuminating light fluxes of from the illumination device 100A according to image information, and a projection system 600 for projecting the illuminating light fluxes modulated by the liquid-crystal devices 400R, 400G, 400B. Accordingly, light utilization efficiency and cost reduction can be achieved furthermore for the projector.

Third Exemplary Embodiment

Figure 5A:
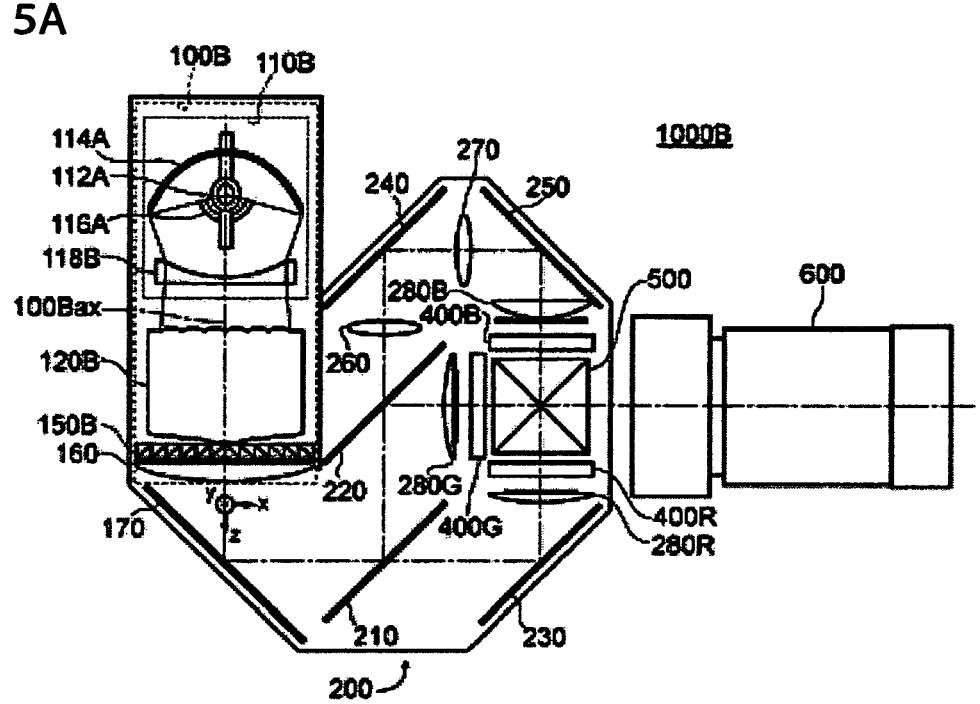
FIGS. 5A to 5C are views illustrating an illumination device and projector according to a third exemplary embodiment.
Figure 5B:
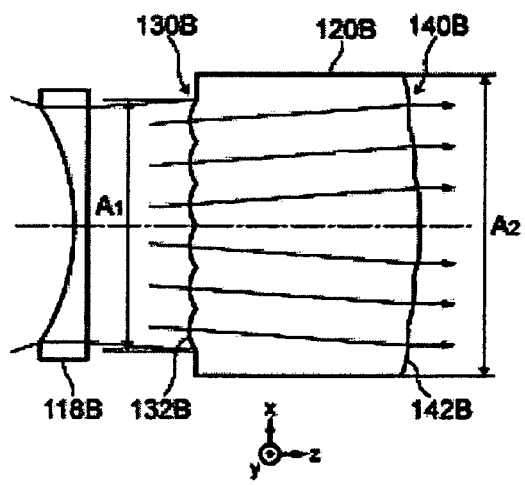
Figure 5C:
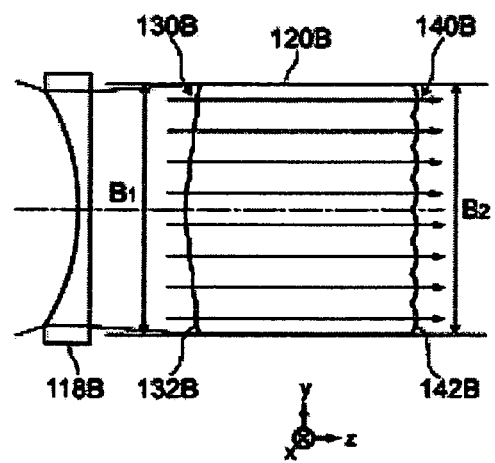

FIGS. 5A to 5C illustrate an illumination device 100B and projector 1000B according to a third exemplary embodiment. FIG. 5A is a view showing an optical system of the projector 1000B, FIG. 5B a top view of a light-transmissive member 120B used on the projector 1000B, and FIG. 5C a side view of the light-transmissive member 120B used on the projector 1000B.

The illumination device 100B in the third exemplary embodiment is different from the illumination device 100A of the second exemplary embodiment, in respect of the structure of the light source, polarization conversion element and light-transmissive member, as shown in FIGS. 5A to 5C.

Namely, the illumination device 100B in the third exemplary embodiment employs a light source 100B that is to emit a diverging illuminating light flux toward the illumination area, a polarization conversion element 150B different in the range of effective incident area from the polarization conversion element 150A of the second-exemplary embodiment illumination device 100A, and a light-transmissive member 120B having a plurality of first small lenses 132B made eccentric vertically (in the y-direction) of the first lens array 130B and a plurality of second small lenses 142B made eccentric laterally (in the x-direction) of the second lens array 140B.

The illumination device 100B in the third exemplary embodiment is different from the illumination device 100A of the second exemplary embodiment, in the operation of the lens provided closer to the illumination area with respect to the ellipsoidal reflector.

Namely, the illumination device 100A in the second exemplary embodiment is structured that a concave lens 118A is provided closer to the illumination area with respect to the ellipsoidal reflector 114A as shown in FIG. 4A so that the converging light emitted from the ellipsoidal reflector 114A is converted into light nearly parallel with the axis 100Aax of illumination light by the concave lens 118A and then allowed to exit the light source 110A.

Contrary to this, the illumination device 100B of the third exemplary embodiment is structured that a concave lens 118B is provided closer to the illumination area with respect to the ellipsoidal reflector 114A as shown in FIG. 5A so that the converging light, once emitted from the ellipsoidal reflector 114A, can be emitted, from the light source 110B, as a light diverging outward about the axis 100Bax of illumination light by the concave lens 118B. Namely, a central axis of the diverging light from the concave lens 118A coincides with the axis 100Bax of illumination light.

In the illumination device 100B of the third exemplary embodiment, the partial light flux from the first lens array 130B is of light traveling outward on the plane (xz plane) parallel with the lateral direction of the first lens array 130B (in the x-direction) and with the axis 100Bax of illumination light (in the z-direction) as shown in FIG. 5B. The second lens array 140B is required to change it into light traveling parallel with the axis 100Bax of illumination light. For this reason, the plurality of second small lenses 142B is made eccentric laterally (in the x-direction) of the second lens array 140B.

Meanwhile, in the illumination device 100B of the third exemplary embodiment, the plurality of second small lenses 142B are not made eccentric vertically (in the y-direction) of the second lens array 140B as shown in FIG. 5C in order to reduce the steps in the boundaries between the second small lenses 142B. Due to this, because of the need to change the diverging illuminating light flux from the light source 110B toward the illumination area into collimated light nearly parallel with the axis 100Bax of illumination light, the plurality of first small lenses 132B is made eccentric vertically (in the y-direction) of the first lens array 130B. In this manner, the first small lens 132B and the second small lens 142B are made eccentric in respective directions (deviation between the lens optical axis and the lens geometric center) perpendicular to each other.

As a result, in the illumination device 100B of the third exemplary embodiment, the second lens array 140B has a lateral size $A_2$ greater than the lateral size $A_1$ of the first lens array 130B while the second lens array 140B has a vertical size $B_2$ nearly equal to the vertical size $B_1$ of the first lens array 130B.

The first small lenses 132B of the first lens array 130B are made eccentric, all together, in the same direction (in the y-direction) on a row-by-row basis. Namely, the first small lenses 132B constituting the same row have respective optical axes in the same position in the y-direction wherein the lens geometric centers thereof are also in the same position in the y-direction. Meanwhile, the first small lenses 132B are not made eccentric in the x-direction. In this manner, the first lens array 130B is made eccentric, all together, only on a row-by-row basis wherein the first small lenses are different in their surface forms on a row-by-row basis. Thus, the first small lenses 132B are adjusted in thickness on the row-by-row basis in a manner reducing the steps in the row boundaries.

The second small lenses 142B of the second lens array 140B are also made eccentric, all together, in the same direction (in the x-direction) on a column-by-column basis. Namely, the second small lenses 142B constituting the same column have lens optical axis in the same position in the x-direction while the lens geometric centers thereof are also in the same position in the x-direction. Meanwhile, the second small lenses 142B are made not eccentric in the y-direction. In this manner, the second lens array 140B is made eccentric only on the column-by-column basis as described above wherein the second small lenses are different in surface shape on a column-by-column basis. Accordingly, the second small lenses 142B are adjusted in thickness on the column-by-column basis in a manner reducing the steps in the column boundaries.

Accordingly, the illumination device 100B in the third exemplary embodiment makes it possible to reduce the steps over the entire surface of the first and second lens arrays 130B, 140B. Naturally, the steps can be eliminated from the entire surface of the first and second lens arrays 130B, 140B.

According to the illumination device 100B in the third exemplary embodiment, as shown in FIGS. 5B and 5C, the illuminating light fluxes, emitted from the light source 110B and diverging outward about the axis 100ax of illumination light, are turned by the first lens array 130B made eccentric only vertically (in the y-direction) on a row-by-row basis into partial light fluxes traveling outwardly toward the second lens array 140B as they are on the plane (on the xz plane) parallel with the lateral direction of the first lens array 130B (in the x-direction) and with the axis 100Bax of illumination light (in the z-direction), and into partial light fluxes traveling parallel with the axis 100ax of illumination light and toward the second lens array 140B on the plane (on the yz plane) parallel with the vertical direction of the first lens array 130B (in the y-direction) and with the axis 100Bax of illumination light (in the z-direction).

The partial light fluxes, transmitted the light-transmissive member 120B by entering at the first lens array 130B, are allowed by the second lens array 140B made eccentric only laterally (in the x-direction) on a column-by-column basis to exit as partial light fluxes parallel with the axis 100Bax of illumination light on the plane (on the xz plane) parallel with the lateral direction of the first lens array 130B (in the x-direction) and with the axis 100Bax of illumination light (in the z-direction) from the second lens array 140B, and to exit as partial light fluxes parallel with the axis 100Bax of illumination light as they are on the plane (on the yz plane) parallel with the vertical direction of the first lens array 130B (in the y-direction) and with the axis 100Bax of illumination light (in the z-direction) from the second lens array 140B.

In this manner, the illumination device 100B of the third exemplary embodiment is different from the illumination device 100A of the second exemplary embodiment, in respect of the structure of the light source, the polarization conversion device and the light-transmissive member. However, because the first and second lens arrays 130B, 140B are formed integral as one light-transmissive member 120B, it is possible to eliminate two interfaces between air and the optical member similarly to the illuminator device 100A of the second exemplary embodiment. This can reduce the unwanted reflections and hence improve the efficiency of light utilization. Meanwhile, cost reduction can be achieved because of the capability of reducing the number of optical components.

Meanwhile, according to the illumination device 100B of the third exemplary embodiment, the first lens array 130B is adjusted in thickness at the first small lenses 132B in a manner reducing the steps in the boundaries between the first small lenses 132B while the second lens array 140B is adjusted in thickness at the second small lenses 142B in a manner reducing the steps in the boundaries between the second small lenses 142B. This can eliminate the problem of the impossibility to fabricate a lens array having a desired form for first and second lens arrays, similarly to the illumination device 100A of the second exemplary embodiment.

Furthermore, according to the illumination device 100B of the third exemplary embodiment, the plurality of first small lenses 132B is made eccentric only vertically (in the y-direction) while the plurality of second small lenses 142B is made eccentric only laterally (in the x-direction). This makes it possible to reduce the steps over the entire surface of the first and second lens arrays 130B, 140B similarly to the illumination device 100A of the second exemplary embodiment, and hence to fabricate a lens array having a desired form for first and second lens arrays.

Therefore, the illumination device 100B in the third exemplary embodiment can achieve to improve the light utilization efficiency and reduce the cost for the projector, similarly to the illumination device 100A in the first exemplary embodiment.

Meanwhile, in the illumination device 100B of the third exemplary embodiment, the light source 110B emits an illuminating light flux diverging outward about the axis 100Bax of illumination light. The first lens array 130B is made eccentric only vertically (in the y-direction) while the second lens array 140B is made eccentric only laterally (in the x-direction). Accordingly, the illuminating light flux emitted from the illumination device 100B diverges in both lateral and vertical directions (in the x-axis and y-directions) wherein it can be emitted as partial light fluxes traveling parallel with the axis 100Bax of illumination light.

Due to this, the illumination device 100B in the third exemplary embodiment makes it possible to favorably separate the images by the first-small lens-132B laterally (in the x-direction) and vertically (in the y-direction) of the first lens array 130B and to emit light traveling parallel with the axis 100Bax of illumination light. As a result, even in case the focused image of partial light flux has a given size, it is positively incident upon the effective incident area of the polarization conversion element 150B, to form a focused image in a position nearby the polarization separation layer. This can improve the light utilization efficiency on the illumination device 10B.

The projector 1000B in the third exemplary embodiment has the illumination device 100B, the liquid-crystal devices 400R, 400G, 400B for modulating an illuminating light flux from the illumination device 100B according to image information, and the projection system 600 for projecting the illumination light modulated by the liquid-crystal devices 400R, 400G, 400B. Accordingly, light utilization efficiency and cost reduction can be achieved furthermore for the projector.

Fourth Exemplary Embodiment

Figure 6A:
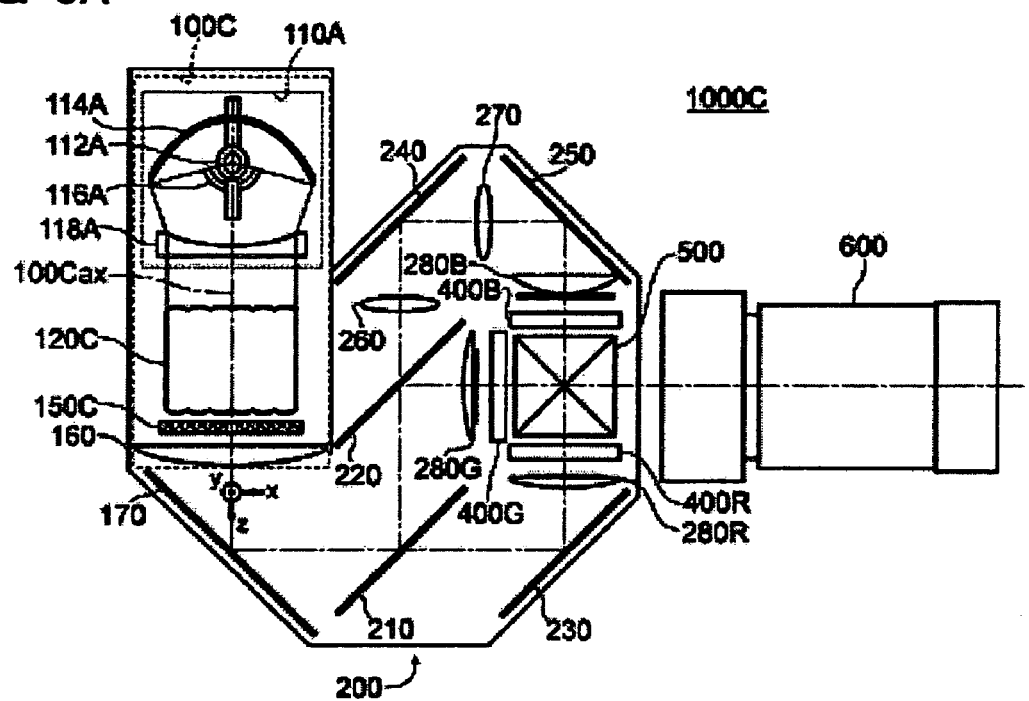
FIGS. 6A to 6C are views illustrating an illumination device and projector according to a fourth exemplary embodiment.
Figures 6B, 6C:
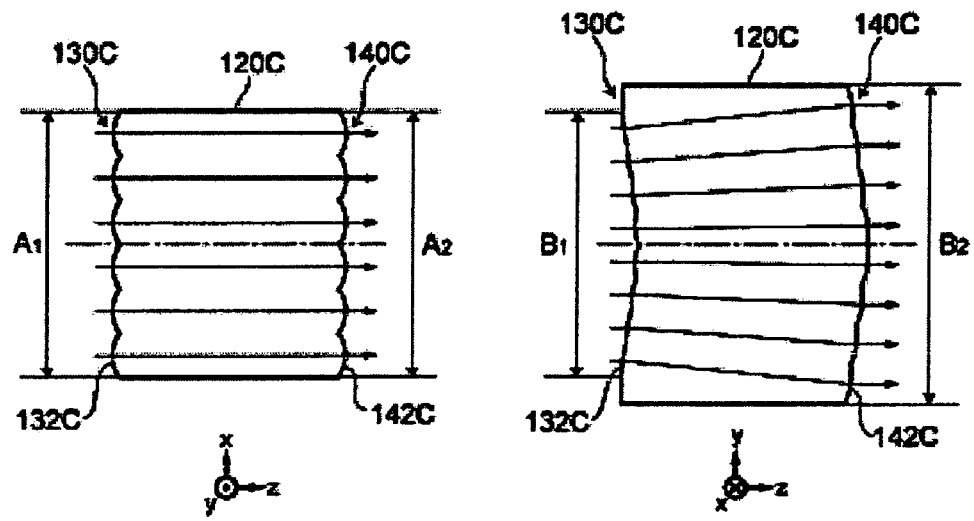

FIGS. 6A to 6C illustrate an illumination device 100C and projector 1000C according to a fourth exemplary embodiment. FIG. 6A is a view showing an optical system of the projector 1000C, FIG. 6B a top view of a light-transmissive member 120C used on the projector 1000C, and FIG. 6C a side view of the light-transmissive member 120C used on the projector 1000C.

Figure 7A:
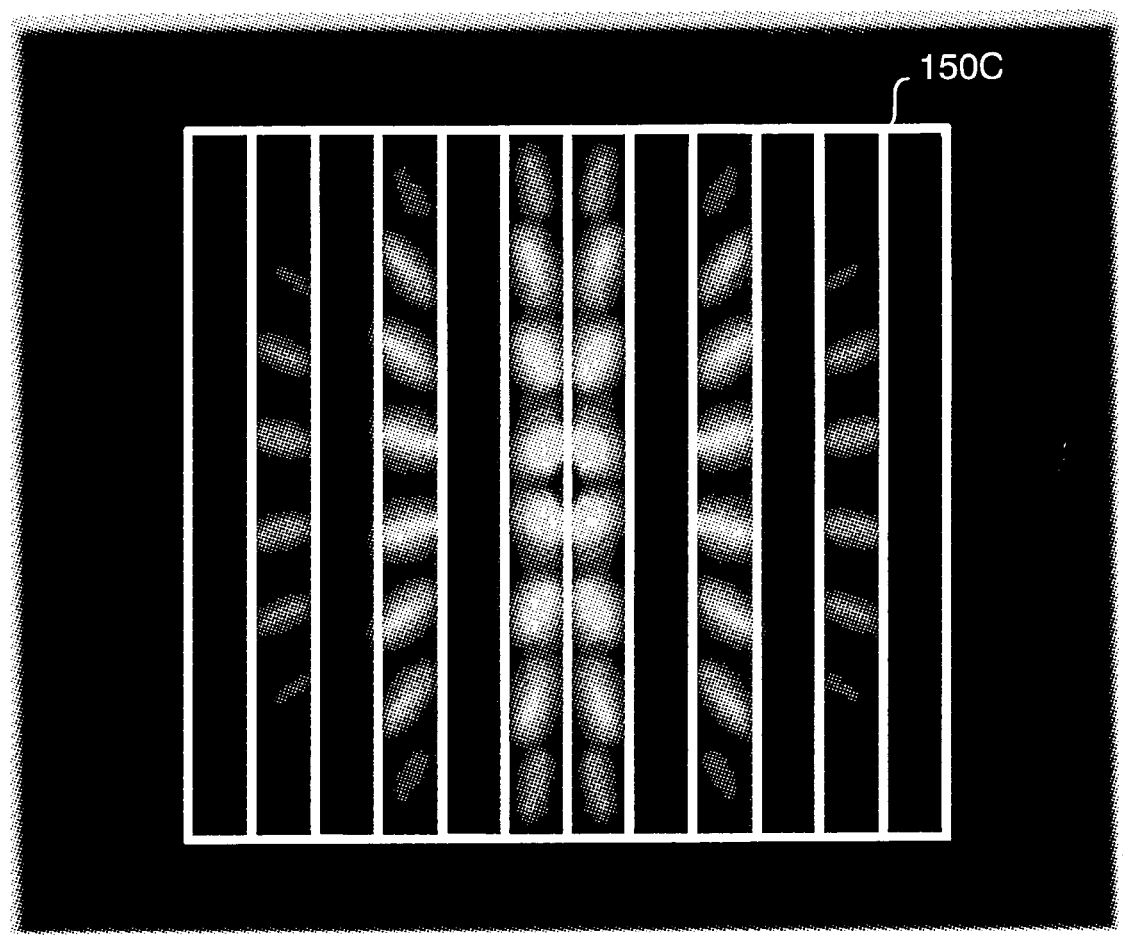
FIGS. 7A and 7B are figures illustrating the effect of the illumination device in the fourth exemplary embodiment.
Figure 7B:
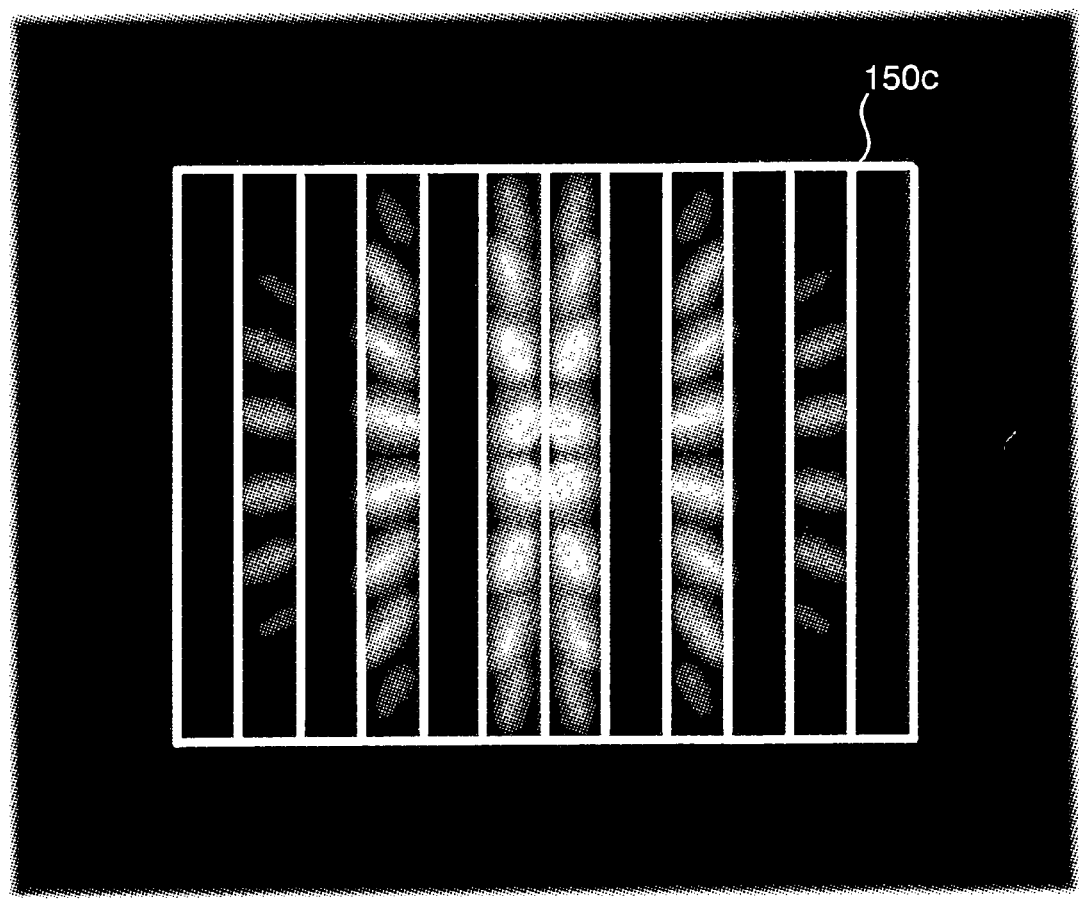

FIGS. 7A and 7B illustrate an effect of the illumination device 100C in the fourth exemplary embodiment. FIG. 7A is a figure showing images on a light-incident surface of the polarization conversion element 150C by first small lenses 132C in the present exemplary embodiment while FIG. 7B is a figure showing images on a light-incident surface of the polarization conversion element 150c by first small lenses in a comparative example.

The illumination device 100C in the fourth exemplary embodiment is different from the illumination device 100A of the second exemplary embodiment, in respect of the structure of the polarization conversion element and light-transmissive member, as shown in FIGS. 6A to 6C.

Namely, the illumination device 100C in the fourth exemplary embodiment uses a polarization conversion element 150C different in the range of effective incident areas from the polarization conversion element 150A of the illumination device 100A of the second exemplary embodiment, and a light-transmissive member 120C having a plurality of first small lenses 132C made eccentric vertically (in the y-direction) of the first lens array 130C and a plurality of second small lenses 142C made eccentric vertically (in the y-direction) of the second lens array 140C.

In the illumination device 100C of the fourth exemplary embodiment, the partial light flux from the first lens array 130C is of light traveling outward on the plane (on the yz plane) parallel with the vertical direction (y-direction) of the first lens array 130C and with the axis 100Cax of illumination light (in the z-direction), as shown in FIG. 6C. However, the second lens array 140C is required to change it into light parallel with the axis 100Cax of illumination light. For this reason, the plurality of second small lenses 142C is made eccentric vertically (in the y-direction) of the second lens array 140C.

Meanwhile, in the illumination device 100C of the fourth exemplary embodiment, the plurality of first small lenses 132C is not made eccentric laterally (in the x-direction) of the first lens array 130C as shown in FIG. 6B in order to reduce the steps in the boundaries between the first small lenses 132C. Meanwhile, the plurality of second small lenses 142C is not made eccentric laterally (in the x-direction) of the second lens array 140C in order to reduce the steps in the boundaries between the second small lenses 142C. In this manner, the first small lens 132C and the second small lens 142C are made eccentric (deviated between the lens optical axis and the lens geometric center) oppositely in direction to each other along an axis in a certain direction.

As a result, in the illumination device 100C of the fourth exemplary embodiment, the second lens array 140C has a vertical size $B_2$ greater than the vertical size $B_1$ of the first lens array 130C while the second lens array 140C has a lateral size $A_2$ nearly equal to the lateral size $A_1$ of the first lens array 130C.

The first small lenses 132C of the first lens array 130C are made eccentric, all together, in the same direction (in the y-direction) on a row-by-row basis. Namely, the first small lenses 132C constituting the same row have respective optical axes in the same position in the y-direction wherein the lens geometric centers thereof are also in the same position in the y-direction. Meanwhile, the first small lenses 132C are not made eccentric in the x-direction. In this manner, the first lens array 130C is made eccentric, all together, only on a row-by-row basis wherein the first small lenses 132C are different in their surface forms on a row-by-row basis. Thus, the first small lenses 132 are adjusted in thickness on the row-by-row basis in a manner reducing the steps in the row boundaries.

The second small lenses 142C of the second lens array 140C are also made eccentric, all together, in the same direction (in the y-direction) on a row-by-row basis similarly to the first lens array 130C. Accordingly, the second small lenses 142C are adjusted in thickness on the row-by-row basis in a manner reducing the steps in the row boundaries.

Accordingly, the illumination device 100C in the fourth exemplary embodiment makes it possible to reduce the steps throughout the surface of the first lens array 130C and second lens array 140C. Naturally, the steps can be eliminated from the entire surface of the first lens array 130C and second lens array 140C.

According to the illumination device 100C in the fourth exemplary embodiment, the illuminating light fluxes, emitted parallel with the axis 100ax of illumination light from the light source 110A, are turned by the first lens array 130C made eccentric only vertically (in the y-direction) on a row-by-row basis into partial light fluxes traveling parallel with the axis 100Cax of illumination light and toward the second lens array 140C as it is on the plane (on the xz plane) parallel with the lateral direction of the first lens array 130C (in the x-direction) and with the axis 100Cax of illumination light (in the z-direction), and into partial light fluxes traveling outward toward the second lens array 140C on the plane (on the yz plane) parallel with the vertical direction of the first lens array 130C (in the y-direction) and with the axis 100Cax of illumination light (in the z-direction).

The partial light fluxes, transmitted the light-transmissive member 120C by entering at the first lens array 130C, are allowed by the second lens array 140C made eccentric only vertically (in the y-direction) on a row-by-row basis to exit as partial light fluxes parallel with the axis 100Cax of illumination light as they are from the second lens array 140C on the plane (on the xz plane) parallel with the lateral direction of the first lens array 130C (in the x-direction) and with the axis 100Cax of illumination light (in the z-direction), and to exit again as partial light fluxes parallel with the axis 100Cax of illumination light from the second lens array 140C on the plane (on the yz plane) parallel with the vertical direction of the first lens array 130C (in the y-direction) and with the axis 100Cax of illumination light (in the z-direction).

In this manner, the illumination device 100C of the fourth exemplary embodiment is different from the illumination device 100A of the second exemplary embodiment, in respect of the structure of the polarization conversion device and the light-transmissive member. However, because the first and second lens arrays 130C, 140C are formed integral as one light-transmissive member 120C, it is possible to eliminate two interfaces between air and the optical member similarly to the illuminator device 100A in the second exemplary embodiment. This can reduce the unwanted reflections and hence improve the efficiency of light utilization. Meanwhile, cost reduction can be achieved because of the capability of reducing the number of optical components.

Meanwhile, according to the illumination device 100C of the fourth exemplary embodiment, the first lens array 130C is adjusted in thickness at the first small lenses 132C in a manner reducing the steps in the boundaries between the first small lenses 132C while the second lens array 140c is adjusted in thickness at the second small lenses 142C in a manner reducing the steps in the boundaries between the second small lenses 142C. This can eliminate the problem of the impossibility to fabricate a lens array having a desired form for first and second lens arrays, similarly to the illumination device 100A in the second exemplary embodiment.

Furthermore, according to the illumination device 100C of the fourth exemplary embodiment, the plurality of first small lenses 132C and the plurality of second lenses 142C are made eccentric only vertically (in the y-direction). This makes it possible to reduce the steps over the entire surface of the first and second lens arrays 130C, 140C similarly to the illumination device 100A in the second exemplary embodiment, and hence to fabricate a lens array having a desired form for first and second lens arrays.

Therefore, the illumination device 100C in the fourth exemplary embodiment can achieve to improve the light utilization efficiency and reduce the cost for the projector, similarly to the illumination device 100A in the second exemplary embodiment.

Meanwhile, in the illumination device 100C of the fourth exemplary embodiment, because the plurality of first small lenses 132C is made eccentric vertically (in the y-direction) of the first lens array 130C, the partial light flux from the first lens array 130C is of light traveling outward toward the second lens array 140C on the plane (on the yz plane) parallel with the vertical direction (y-direction) of the first lens array 130C and with the axis 100Cax of illumination light (in the z-direction).

Therefore, according to the illumination device 100C in the fourth exemplary embodiment, the images by the first small lenses 132C are favorably separated vertically (in the y-direction) of the first lens array 130C, as shown in FIG. 7A. As a result, even where the focused image of partial light flux has a given size, the partial light flux is positively incident upon the effective incident area of the polarization conversion element 150C to thereby form a focused image in a position nearby the polarization separation layer, thus improving the light utilization efficiency on the illumination device 100C. Meanwhile, the illumination device 100C in the fourth exemplary embodiment is suited as an illumination device that is to illuminate an electro-optic modulator such as a liquid-crystal device 400R, 400G, 400B, at its illumination area uniformly in on-plane intensity distribution and with brightness The projector 1000C in the fourth exemplary embodiment has the illumination device 100C, the liquid-crystal devices 400R, 400G, 400B for modulating an illuminating light flux from the illumination device 100C according to image information, and the projection system 600 for projecting the illumination light modulated by the liquid-crystal devices 400R, 400G, 400B. Accordingly, improved light utilization efficiency and cost reduction can be achieved furthermore for the projector.

Fifth Exemplary Embodiment

Figure 8A:
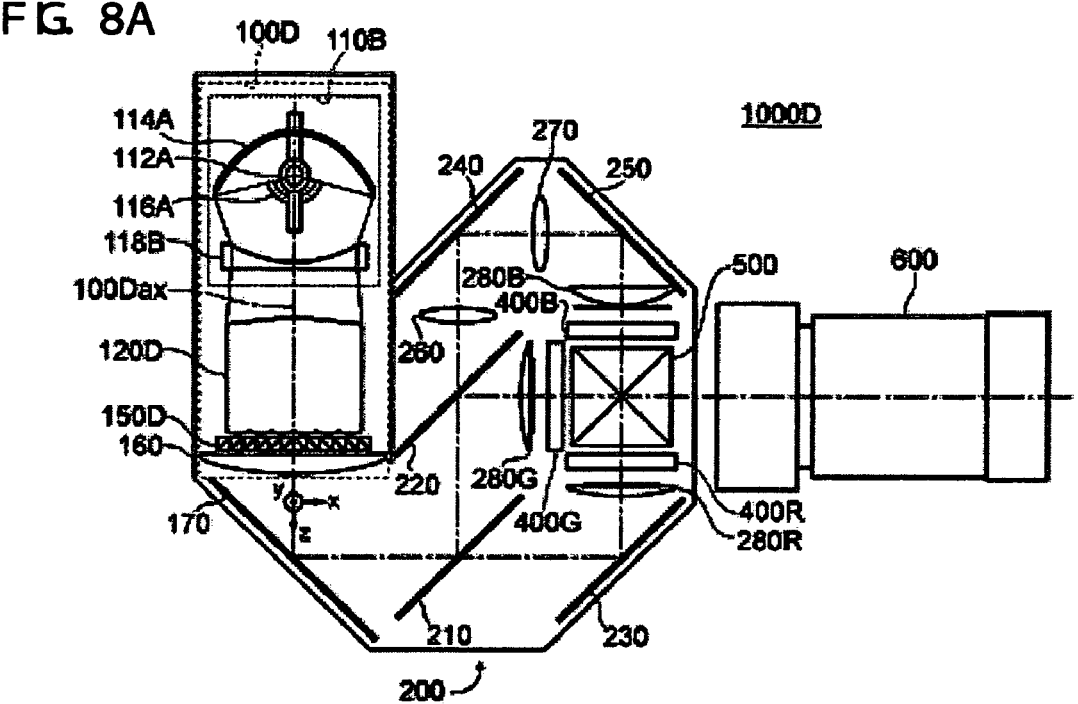
FIGS. 8A to 8C are views illustrating an illumination device and projector according to a fifth exemplary embodiment.
Figure 8B:
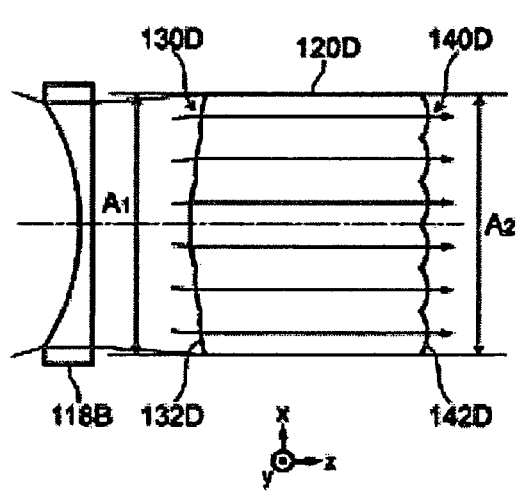
Figure 8C:
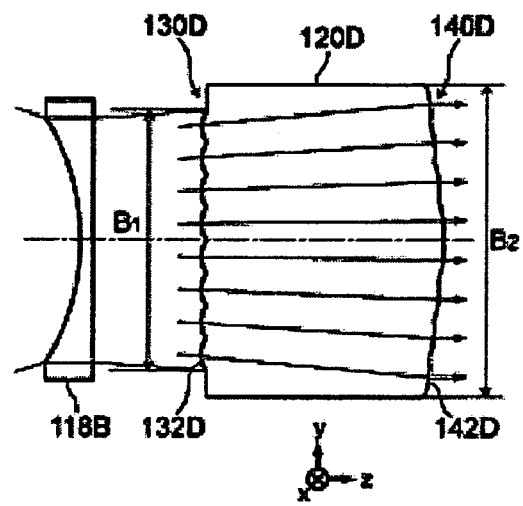
Figure 9A:
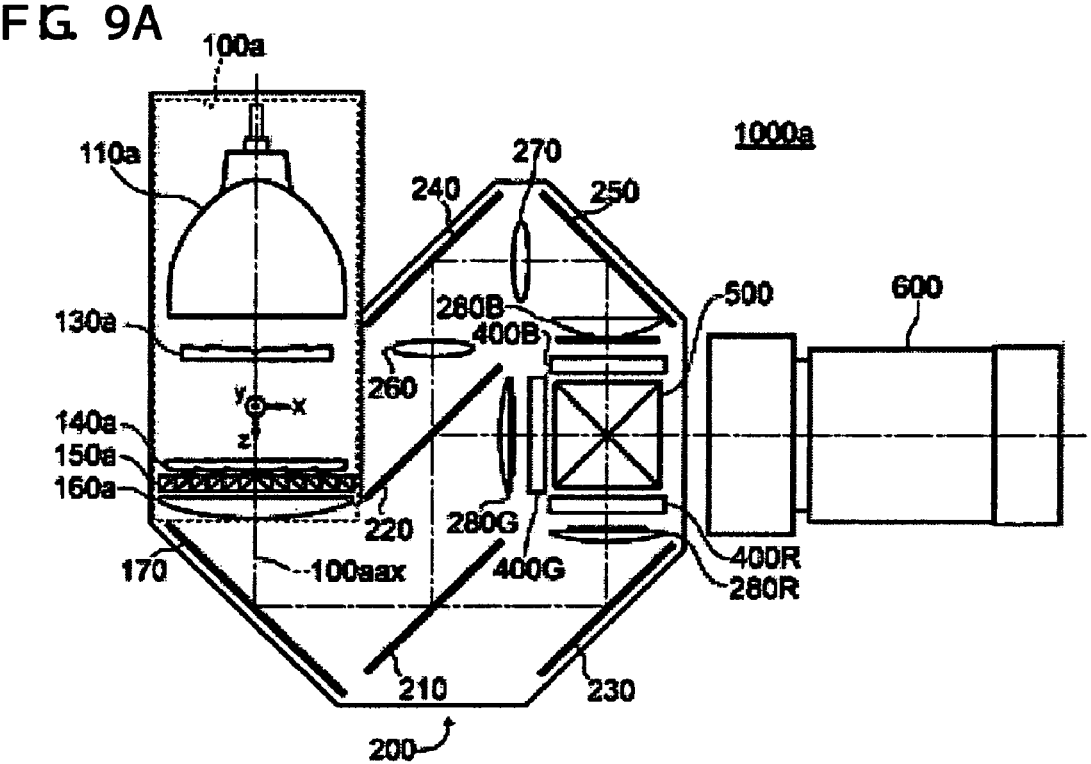
FIGS. 9A and 9B are views illustrating the projector in a related art.
Figure 9B:
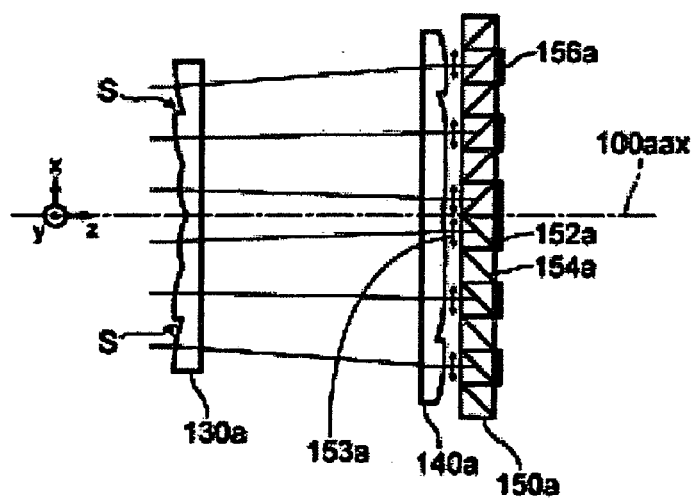
Figure 10:
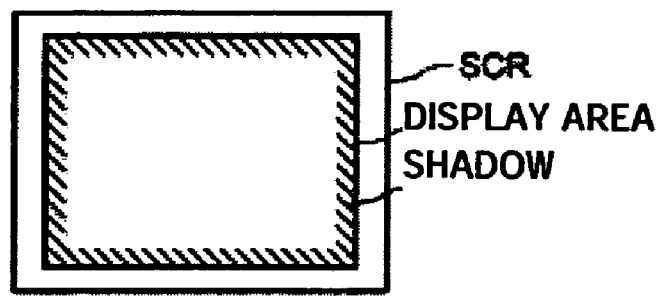
FIG. 10 is a view illustrating a shadow on the projector in a related art.
Figure 11:
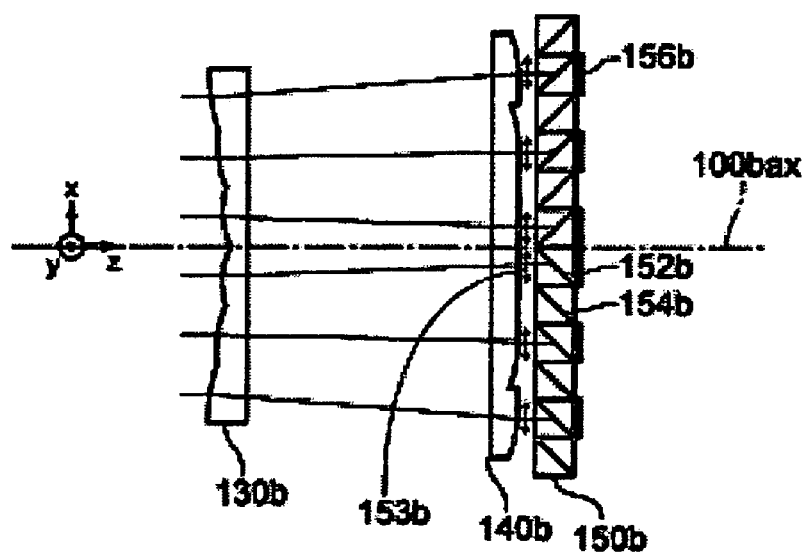
FIG. 11 is a view showing an essential part of another related art illumination device.

FIGS. 8A to 8C illustrate an illumination device 100D and projector 1000D according to a fifth exemplary embodiment. FIG. 8A is a view showing an optical system of the projector 1000D, FIG. 8B a top view of a light-transmissive member 120D used on the projector 1000D, and FIG. 8C a side view of the light-transmissive member 120D used on the projector 1000D.

The illumination device 100D in the fifth exemplary embodiment is different from the illumination device 100B of the third exemplary embodiment, in respect of the structure of the polarization conversion element and light-transmissive member as shown in FIGS. 8A to 8C.

Namely, the illumination device 100D in the fifth exemplary embodiment uses a polarization conversion element 150D different in the range of effective incident area from the polarization conversion element 150B of the illumination device 100B of the third exemplary embodiment, and a light-transmissive member 120D having a plurality of first small lenses 132D made eccentric laterally (in the x-direction) of the first lens array 130D and a plurality of second small lenses 142D made eccentric vertically (in the y-direction) of the second lens array 140D. Incidentally, a light source 110B is used to emit a diverging illuminating light flux toward the illumination area, similarly to the illumination device 100B of the third exemplary embodiment.

In the illumination device 100D of the fifth exemplary embodiment, the partial light flux from the first lens array 130D is of light traveling outward on the plane (on the yz plane) parallel with the vertical direction (y-direction) of the first lens array 130D and with the axis 100Dax of illumination light (in the z-direction), as shown in FIG. 8C. However, the second lens array 140D is required to change it into light parallel with the axis 100Dax of illumination light. For this reason, the plurality of second small lenses 142D is made eccentric vertically (in the y-direction) of the second lens array 140D.

Meanwhile, in the illumination device 100D of the fifth exemplary embodiment, the plurality of second small lenses 142D is not made eccentric laterally (in the x-direction) of the second lens array 140D as shown in FIG. 8B in order to reduce the steps in the boundaries between the second small lenses 142D. Meanwhile, because this requires to convert a diverging illuminating light flux from the light source 110B toward the illumination area into light traveling nearly parallel with the axis 100Dax of illumination light, the plurality of first small lenses 132D is made eccentric laterally (in the x-direction) of the first lens array 130D. In this manner, the first small lens 132D and the second small lens 142D are in eccentricity directions that are along axes orthogonal to each other (deviational directions between the lens optical axis and the lens geometric center).

For this reason, in the illumination device 100D of the fifth exemplary embodiment, the second lens array 140D has a vertical size $B_2$ greater than the vertical size $B_1$ of the first lens array 130D while the second lens array 140D has a lateral size $A_2$ nearly equal to the lateral size $A_1$ of the first lens array 130D.

The first small lenses 132D of the first lens array 130D are made eccentric, all together, in the same direction (in the x-direction) on a column-by-column basis. Namely, the first small lenses 132D constituting the same column have their lens optical axes in the same position in the x-direction wherein the lens geometric centers are also in the same position in the x-direction. Meanwhile, the first small lenses are not made eccentric in the y-direction. In this manner, the first lens array 130D are made eccentric, all together, on a column-by-column basis as mentioned above wherein the first small lenses are different in surface shape on a column-by-column basis. Accordingly, the first small lenses 132D are adjusted in thickness on the column-by-column basis in a manner reducing the steps in the column boundaries.

The second small lenses 142D of the second lens array 140D are made eccentric, all together, in the same direction (in the y-direction) on a row-by-row basis. Namely, the second small lenses 142D constituting the same row have their lens optical axes in the same position in the y-direction wherein the lens geometric centers are also in the same position in the y-direction. Meanwhile, the second small lenses 142D are not made eccentric in the x-direction. In this manner, the second lens array 140D are made eccentric, all together, only on a row-by-row basis as mentioned above wherein the second small lenses are different in surface shape on a row-by-row basis. Accordingly, the second small lenses 142D are adjusted in thickness on the row-by-row basis in a manner reducing the steps in the row boundaries.

Therefore, the illumination device 100D in the fourth exemplary embodiment makes it possible to reduce the steps throughout the surface of the first and second lens arrays 130D, 140D. Naturally, the steps can be eliminated from the entire surface of the first and second lens arrays 130D, 140D.

According to the illumination device 100D in the fifth exemplary embodiment, the illuminating light fluxes, emitted diverging outward about the axis 100Dax of illumination light from the light source 110B, are turned by the first lens array 130D made eccentric only laterally (in the x-direction) on a column-by-column basis into partial light fluxes traveling parallel with the axis 100Dax of illumination light and toward the second lens array 140D on the plane (on the xz plane) parallel with the lateral direction of the first lens array 130D (in the x-direction) and with the axis 100Dax of illumination light (in the z-direction), and into partial light fluxes traveling outward directly toward the second lens array 140D as they are on the plane (on the yz plane) parallel with the vertical direction of the first lens array 130D (in the y-direction) and with the axis 100Dax of illumination light (in the z-direction).

The partial light fluxes, transmitted the light-transmissive member 120D by entering at the first lens array 130D, are allowed by the second lens array 140D made eccentric only vertically (in the y-direction) on a row-by-row basis to exit as partial light fluxes parallel with the axis 100ax of illumination light from the second lens array 140D as they are on the plane (on the xz plane) parallel with the lateral direction of the first lens array 130D (in the x-direction) and with the axis 100Dax of illumination light (in the z-direction), and to exit as partial light fluxes parallel with the axis 100Dax of illumination light from the second lens array 140D on the plane (on the yz plane) parallel with the vertical direction of the first lens array 130D (in the y-direction) and with the axis 100Dax of illumination light (in the z-direction).

In this manner, the illumination device 100D of the fifth exemplary embodiment is different from the illumination device 100B of the third exemplary embodiment, in respect of the structure of the polarization conversion device and the light-transmissive member. However, because the first and second lens arrays 130D, 140D are formed integral as one light-transmissive member 120D, it is possible to eliminate two interfaces between air and the optical member similarly to the illuminator device 100B in the third exemplary embodiment. This can reduce the unwanted reflections thus improving the efficiency of light utilization. Meanwhile, cost reduction can be achieved because of the capability of reducing the number of optical components.

Meanwhile, according to the illumination device 100D of the fifth exemplary embodiment, the first lens array 130D is adjusted in thickness at the first small lenses 132D in a manner reducing the steps in the boundaries between the first small lenses 132D while the second lens array 140D is adjusted in thickness at the second small lenses 142D in a manner reducing the steps in the boundaries between the second small lenses 142D. This can eliminate the problem of the impossibility to fabricate a lens array having a desired form for first and second lens arrays, similarly to the illumination device 100B of the third exemplary embodiment.

Furthermore, according to the illumination device 100D of the fifth exemplary embodiment, the plurality of first small lenses 132D is made eccentric only laterally (in the x-direction) while the plurality of second lenses 142D is made eccentric only vertically (in the y-direction). This makes it possible to reduce the steps throughout the surface of the first and second lens arrays 130D, 140D similarly to the illumination device 100B of the third exemplary embodiment, and hence to fabricate a lens array having a desired form for first and second lens arrays.

Therefore, the illumination device 100D in the fifth exemplary embodiment can achieve to improve the light utilization efficiency and reduce the cost for the projector, similarly to the illumination device 100B of the third exemplary embodiment.

Meanwhile, in the illumination device 100D of the fifth exemplary embodiment, the light source 110B emits an illuminating light flux diverging outward about the axis 100B of illumination light. The first lens array 130D is made eccentric only laterally (in the x-direction) while the second lens array 140D is made eccentric only vertically (in the y-direction). Accordingly, the illuminating light flux emitted from the illumination device 100D diverges in both lateral and vertical directions (in the x-axis and y-directions) wherein it can be emitted as partial light fluxes traveling parallel with the axis 100Bax of illumination light.

Due to this, the illumination device 100D in the fifth exemplary embodiment makes it possible to separate further favorably the images by the first-small lenses-132D laterally (in the x-direction) and vertically (in the y-direction) into light exiting parallel with the axis 100Dax of illumination light. As a result, even where the focused image of partial light flux has a given size, it is positively incident upon the effective incident area of the polarization conversion element 150D, to form a focused image in a position nearby the polarization separation layer, thus improving the light utilization efficiency on the illumination device 100D. Meanwhile, the illumination device 100D in the fifth exemplary embodiment is suited as an illumination device that is to illuminate an electro-optic modulator, such as a liquid-crystal device 400R, 400G, 400B, at its illumination area uniformly in on-plane intensity distribution and with brightness.

The projector 1000D in the fifth exemplary embodiment has the illumination device 100D, the liquid-crystal devices 400R, 400G, 400B for modulating an illuminating light flux from the illumination device 100D according to image information, and the projection system 600 for projecting the illuminating light flux modulated by the liquid-crystal devices 400R, 400G, 400B. Accordingly, light utilization efficiency and cost reduction can be achieved furthermore for the projector.

Although the projectors in association with the exemplary embodiments of the invention have been described above, the invention is not limited to the foregoing embodiments but can be implemented in various forms within the scope not departing from the gist thereof. For example, the following modifications are feasible.

The projectors 1000 to 1000D in the exemplary embodiments used the first small lens 132, 132B, 132D having a plan shape of "rectangular in a ratio of vertical size:lateral size=3:4". However, the invention is not limited to that but can preferably use a shape of "rectangular in a ratio of vertical size:lateral size=9:16" or the like when to take an aspect ratio of 9:6 for the illumination area.

Although the projectors 1000 to 1000D in the exemplary embodiments were of the transmission projector, the invention is not limited to that. The invention is also applicable for a reflective projector. Here, "transmission" means a type that the electro-optical modulator as light modulating device allows light to transmit, e.g. transmission liquid-crystal device while "reflective" means a type that the electro-optical modulator as light modulating device is to reflect light, e.g. reflective liquid-crystal device. Where the invention is applied to a reflective projector, it is possible to obtain an effect similar to that of the transmission projector.

Although the projectors 1000 to 1000D in the exemplary embodiments used the liquid-crystal devices as electro-optical modulators, the invention is not limited to that. The electro-optical modulator, in general, satisfactorily modulates incident light according to image information, i.e. micro-mirror optical modulators may be used. As a micro-mirror optical modulator, a DMD (digital micro-mirror device) (TI's trademark) can be used as micro-mirror optical modulators.

Although the exemplary embodiments were exemplified with the projector using three liquid-crystal devices 400R, 400G, 400B, the invention is not limited to that, i.e. applicable for a projector using one, two or four or more liquid-crystal devices.

The exemplary embodiments can be applied to a front-type projector that is to project an image from observation side, as well as a rear-type projector that is to project an image from the side opposite to observation side.

The priority applications Numbers JP2005-32765 and JP2005-305306 upon which this patent application is based is hereby incorporated by reference.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An illumination device comprising:
   a light source that emits an illuminating light flux toward an illumination area;
   a first lens array having a plurality of first small lenses to split an illuminating light flux emitted from the light source into a plurality of partial light fluxes;
   a second lens array having a plurality of second small lenses corresponding to the plurality of first small lenses of the first lens array;
   a superimposing lens that superimposes together partial light fluxes exiting the plurality of second small lenses of the second lens array onto the illumination area;
   the plurality of first small lenses being made eccentric in a certain direction;
   the plurality of second small lenses being made eccentric in one of the certain direction and a direction orthogonal to the certain direction;
   the first and second lens arrays being integrally formed into one light-transmissive member.

2. The illumination device according to claim 1, wherein the first lens array having a thickness adjusted at the first small lenses in a manner reducing steps in boundaries between the first small lenses while the second lens array having a thickness adjusted at the second small lenses in a manner reducing steps in boundaries between the second small lenses.

3. The illumination device according to claim 1, further comprising
   a polarization conversion element provided between the second lens array and the superimposing lens and that converts incident light into one kind of linearly polarized light to exit, the polarization conversion element having an effective incident area, at least part of the first small lenses and at least part of the second small lenses being made eccentric in a manner allowing the partial light flux to be incident upon the effective incident area of the polarization conversion element.

4. The illumination device according to claim 1, wherein the light source emitting a substantially collimated illuminating light flux toward the illumination area, and the plurality of first small lenses and the plurality of second small lenses being the same in eccentricity direction.

5. The illumination device according to claim 4, wherein each of the plurality of first small lenses being substantially rectangular in outer shape having longer and shorter sides, and the plurality of first small lenses and the plurality of second small lenses being made eccentric in respective directions orthogonal to the longer side of the first small lens.

6. The illumination device according to claim 4, wherein the light source having an arc tube, an ellipsoidal reflector that reflects light from the arc tube, and a concave lens that converts the light reflected by the ellipsoidal reflector into substantially collimated light.

7. The illumination device according to claim 6, wherein the arc tube being provided with an auxiliary mirror that reflects light, emitted from the arc tube toward the illumination area, toward the arc tube.

8. The illumination device according to claim 1, wherein
the light source emitting a diverging illuminating light flux toward the illumination area, and the plurality of first small lenses and the plurality of second small lenses being made eccentric in respective directions orthogonal to each other.

9. The illumination device according to claim 8, wherein
the light source having an arc tube, an ellipsoidal reflector that reflects light from the arc tube, and a concave lens that converts the light reflected by the ellipsoidal reflector into diverging light about the axis of illumination light.

10. The illumination device according to claim 9, wherein
the arc tube being provided with an auxiliary mirror that reflects light, emitted from the arc tube toward the illumination area, toward the arc tube.

11. A projector comprising:
an illumination device;
an electro-optical modulator that modulates an illuminating light flux from the illumination device, according to image information; and
a projection system that projects an illuminating light flux modulated by the electro-optical modulator;
the illumination device comprising:
a light source that emits an illuminating light flux toward an illumination area;
a first lens array having a plurality of first small lenses to split an illuminating light flux emitted from the light source into a plurality of partial light fluxes;
a second lens array having a plurality of second small lenses corresponding to the plurality of first small lenses of the first lens array;
a superimposing lens that superimposes together partial light fluxes exiting the plurality of second small lenses of the second lens array onto the illumination area;
the plurality of first small lenses being made eccentric in a certain direction;
the plurality of second small lenses being made eccentric in one of the certain direction and a direction orthogonal to the certain direction;
the first and second lens arrays being integrally formed into one light-transmissive member.

12. The projector according to claim 11,
wherein the first lens array having a thickness adjusted at the first small lenses in a manner reducing steps in boundaries between the first small lenses while the second lens array having a thickness adjusted at the second small lenses in a manner reducing steps in boundaries between the second small lenses.

13. The projector according to claim 11, further comprising
a polarization conversion element provided between the second lens array and the superimposing lens and that converts incident light into one kind of linearly polarized light to exit, the polarization conversion element having an effective incident area, at least part of the first small lenses and at least part of the second small lenses being made eccentric in a manner allowing the partial light flux to be incident upon the effective incident area of the polarization conversion element.

14. The projector according to claim 11, wherein
the light source emitting a substantially collimated illuminating light flux toward the illumination area, and the plurality of first small lenses and the plurality of second small lenses being the same in eccentricity direction.

15. The projector according to claim 14, wherein
each of the plurality of first small lenses being substantially rectangular in outer shape having longer and shorter sides, and the plurality of first small lenses and the plurality of second small lenses being made eccentric in respective directions orthogonal to the longer side of the first small lens.

16. The illumination device according to claim 14, wherein
the light source having an arc tube, an ellipsoidal reflector that reflects light from the arc tube, and a concave lens that converts the light reflected by the ellipsoidal reflector into substantially collimated light.

17. The illumination device according to claim 16, wherein
the arc tube being provided with an auxiliary mirror that reflects light, emitted from the arc tube toward the illumination area, toward the arc tube.

18. The illumination device according to claim 11, wherein
the light source emitting a diverging illuminating light flux toward the illumination area, and the plurality of first small lenses and the plurality of second small lenses being made eccentric in respective directions orthogonal to each other.

19. The illumination device according to claim 18, wherein
the light source having an arc tube, an ellipsoidal reflector that reflects light from the arc tube, and a concave lens that converts the light reflected by the ellipsoidal reflector into diverging light about the axis of illumination light.

20. The illumination device according to claim 19, wherein
the arc tube being provided with an auxiliary mirror that reflects light, emitted from the arc tube toward the illumination area, toward the arc tube.

\* \* \* \* \*